United States Patent
Liu et al.

(10) Patent No.: US 11,375,500 B2
(45) Date of Patent: Jun. 28, 2022

(54) COMMUNICATION METHOD, BASE STATION, AND USER EQUIPMENT

(71) Applicant: Huawei Technologies Co., Ltd., Shenzhen (CN)

(72) Inventors: Yun Liu, Shenzhen (CN); Da Wang, Shenzhen (CN); Jian Wang, Beijing (CN); Yongbo Zeng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 16/356,943

(22) Filed: Mar. 18, 2019

(65) Prior Publication Data

US 2019/0215843 A1    Jul. 11, 2019

Related U.S. Application Data

(63) Continuation of application No. PCT/CN2016/099332, filed on Sep. 19, 2016.

(51) Int. Cl.
*H04W 72/04* (2009.01)
*H04W 72/12* (2009.01)
(Continued)

(52) U.S. Cl.
CPC ....... *H04W 72/0446* (2013.01); *H04L 1/0003* (2013.01); *H04L 5/0055* (2013.01);
(Continued)

(58) Field of Classification Search
None
See application file for complete search history.

(56) References Cited

U.S. PATENT DOCUMENTS

2011/0194528 A1    8/2011 Dang et al.
2016/0057736 A1    2/2016 Jung et al.
(Continued)

FOREIGN PATENT DOCUMENTS

CN    103796320 A    5/2014
CN    103918203 A    7/2014
(Continued)

OTHER PUBLICATIONS

"E-UTRA Uplink Control Signaling + TP," Source: Motorola, Agenda Item: 11.2.3, Document for: Discussion and Decision, TSG RAN WG1 #45, R1-061172, Shanghai, China, May 8-12, 2006, 8 pages.

(Continued)

*Primary Examiner* — Phirin Sam
*Assistant Examiner* — Sori A Aga
(74) *Attorney, Agent, or Firm* — Slater Matsil, LLP

(57) ABSTRACT

A communication method, a base station, a user equipment (UE), and a communications system. The method includes generating an uplink resource request message including identification information of a first UE, and sending, by the first UE, the uplink resource request message to a base station on a third time domain resource of a first subframe. The first subframe includes a first, second and third time domain resource, the first time domain resource of the first subframe is before the second time domain resource, the second time domain resource is before the third time domain resource, the first time domain resource is used to send first downlink control information, the second time domain resource is used to send downlink data, the first resource indication information indicates a first downlink resource used by base station to send the downlink data to a second UE.

20 Claims, 9 Drawing Sheets

(51) Int. Cl.
  *H04W 76/11* (2018.01)
  *H04L 1/00* (2006.01)
  *H04L 5/00* (2006.01)
  *H04W 72/08* (2009.01)
  *H04W 72/14* (2009.01)
  *H04W 88/02* (2009.01)

(52) U.S. Cl.
  CPC ....... *H04W 72/04* (2013.01); *H04W 72/0406* (2013.01); *H04W 72/085* (2013.01); *H04W 72/12* (2013.01); *H04W 72/14* (2013.01); *H04W 76/11* (2018.02); *H04W 88/023* (2013.01); *H04W 72/1263* (2013.01)

(56) References Cited

U.S. PATENT DOCUMENTS

| 2016/0262173 A1 | 9/2016 | Josiam et al. |
| 2016/0315750 A1 | 10/2016 | Kim et al. |
| 2017/0353971 A1 | 12/2017 | Gupta et al. |
| 2017/0366311 A1* | 12/2017 | Iyer ................. H04B 7/0482 |

FOREIGN PATENT DOCUMENTS

| CN | 105515746 A | 4/2016 |
| EP | 3466176 A1 | 4/2019 |

OTHER PUBLICATIONS

"NR Frame Structure for the Unlicensed Spectrum," Agenda Item: 7.1.4, Source: ZTE, ZTE Microelectronics, Document for: Discussion and Decision, 3GPP TSG RAN WG1 Meeting #85, R1-164275, Nanjing, China May 23-27, 2016, 4 pages.

"Frame Structure Design for NR," Source: ZTE, ZTE Microelectronics, Agenda item: 7.1.4, Document for: Discussion and Decision, 3GPP TSG RAN WG1 Meeting #85, R1-164274, May 23-27, 2016, 11 pages.

* cited by examiner

| First subframe | | | | Second subframe | | | Third subframe | |
|---|---|---|---|---|---|---|---|---|
| UL grant | GP | URLLC request | UL data | UL grant | GP | URLLC UL data | UL grant | ... |
FIG. 9
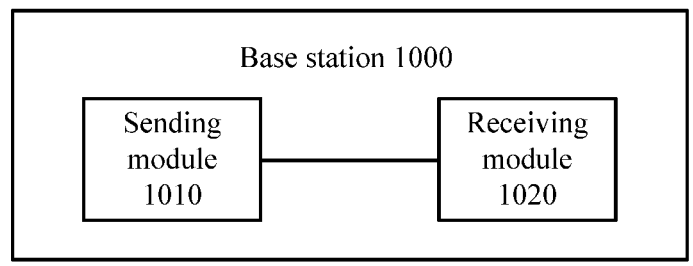
FIG. 10
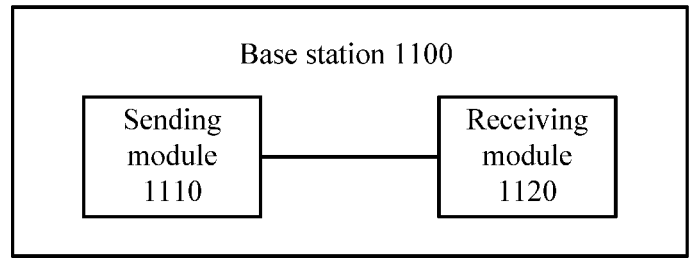
FIG. 11

//<br>

COMMUNICATION METHOD, BASE STATION, AND USER EQUIPMENT

CROSS-REFERENCE TO RELATED APPLICATIONS

This application is a continuation of International Application No. PCT/CN2016/099332, filed on Sep. 19, 2016, which is hereby incorporated by reference in its entirety.

TECHNICAL FIELD

The present invention relates to the communications field, and in particular, to a communication method, a base station, and user equipment (UE).

BACKGROUND

5th Generation New Radio (5G NR) is a new subject proposed by the 3rd Generation Partnership Project (3GPP) organization.

In 5G NR, a self-contained subframe structure is proposed. The self-contained subframe structure includes three parts. A first part is a downlink control (DL control) part. Specifically, downlink grant (DL grant) information or uplink grant (UL grant) information may be transmitted. That is, a base station informs UE of a manner of configuring a downlink resource or an uplink resource. A second part is a service data (data) part. Specifically, the base station may transmit downlink data, or the UE may transmit uplink data based on the uplink resource indicated by the UL grant information in the first part. A third part is an uplink control (UL control) part. Specifically, in the third part, the base station may return a reception status of the uplink data for the uplink data received in the second part, or the UE may transmit uplink channel state information (CSI) to facilitate subsequent scheduling and use by the base station. In some cases, the UL control part is occupied by UL data.

To distinguish subframes of different types, a self-contained subframe for transmitting downlink service data is referred to as a downlink-dominant self-contained subframe, and a self-contained subframe for transmitting uplink service data is referred to as an uplink-dominant self-contained subframe.

Specifically, in the downlink-dominant self-contained subframe, the base station informs the UE in the first part of some resources on which the base station is to transmit the downlink data. Then, the base station transmits the downlink data in the second part. After the downlink data is transmitted, the UE returns, in the third part after a guard period (GP), an acknowledgement (ACK) or a negative acknowledgement (NACK) based on a downlink data reception result.

In the uplink-dominant self-contained subframe, a specific case is that the base station informs, in the first part, the UE of some resources that should be used to transmit the uplink data, and then the UE transmits the uplink data in both the second part and the third part till the end of the subframe. Another specific case is that the base station informs, in the first part, the UE of some resources that should be used to transmit the uplink data, and after a GP, the UE transmits the uplink data in the second part, and transmits uplink control information, for example, CSI, in the third part.

Although 5G NR proposes how the base station informs the UE of configuration information of a resource, how the base station or the UE transmits the service data, and how the UE uploads the uplink control information, 5G NR does not propose a method used by the UE to transmit the uplink resource request message to the base station. Consequently, some UEs cannot obtain configuration information of a resource for transmitting the uplink data, and therefore, cannot transmit the uplink data to the base station.

SUMMARY

The present invention provides a communication method, a base station, UE, a communications system, and a frame structure, so that the UE can send an uplink resource request message to the base station, to obtain resource information used to transmit uplink service data and to transmit the uplink service data to the base station.

According to a first aspect, the present invention provides a communication method, including sending, by a base station, first downlink control information to first user equipment UE on a first time domain resource of a first subframe, sending, by the base station, downlink data to the first UE on a second time domain resource of the first subframe, and receiving, by the base station on a third time domain resource of the first subframe, an uplink resource request message sent by second UE, where the first time domain resource of the first subframe is located before the second time domain resource of the first subframe, the second time domain resource of the first subframe is located before the third time domain resource of the first subframe, the first downlink control information includes first resource indication information, the first resource indication information is used to indicate a first downlink resource used by the base station to send the downlink data, and the uplink resource request message includes identification information of the second UE.

In the communication method, the base station not only may send downlink control information and downlink data to another UE in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

In a possible implementation, the communication method further includes receiving, by the base station on a fourth time domain resource of the first subframe, uplink control information sent by the first UE, where the uplink control information includes first reception status indication information, and the first reception status indication information is used to indicate a reception status of the downlink data.

In the communication method, the base station may further receive, in the first subframe, uplink control information sent by the another UE.

In a possible implementation, the third time domain resource of the first subframe is located before the fourth time domain resource of the first subframe.

In the communication method, the base station receives the uplink resource request message from the UE before receiving the uplink control message from the another UE, that is, before a non-end time domain resource of the first subframe, so that the base station can allocate the uplink resource to the UE within a time period corresponding to a time domain resource after the third time domain resource of the first subframe. That is, the base station can allocate the uplink resource to the UE at an ultra low latency. In addition, because the base station receives the uplink resource request message from the UE and the uplink control information from the another UE on different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes allocating, by the base station, a first uplink resource to the second UE based on the uplink resource request message within a time period corresponding to a time domain resource after the third time domain resource of the first subframe, and sending, by the base station, second downlink control information to the second UE on a first time domain resource of a second subframe, where the second downlink control information includes second resource indication information, and the second resource indication information is used to indicate the first uplink resource.

In the communication method, the base station allocates the uplink resource to the UE within the time period corresponding to the time domain resource after the third time domain resource of the first subframe, so that the base station can allocate the uplink resource to the UE at an ultra low latency. In addition, because the base station receives the uplink resource request message from the UE and the uplink control information from the another UE on the different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes receiving, by the base station on a second time domain resource of the second subframe, uplink data sent by the second UE by using the first uplink resource based on the second downlink control information.

Because first uplink resource indicated by second downlink control information is allocated by the base station to the UE in a case of an ultra low latency and ultra high reliability, ultra-low-latency ultra-reliable communication is realized when the base station receives the uplink data sent by the UE by using the first uplink resource.

In a possible implementation, the communication method further includes sending, by the base station, third downlink control information to the second UE on a first time domain resource of a third subframe, where the third downlink control information includes second reception status indication information, and the second reception status indication information is used to indicate a reception status of the uplink data.

In the communication method, the base station may send, to the UE, a reception status that is in the base station and that is of the uplink data sent by the UE, so that the base station and the UE can perform subsequent communication based on the reception status.

In a possible implementation, the allocating, by the base station, a first uplink resource to the second UE based on the uplink resource request message within a time period corresponding to a time domain resource after the third time domain resource of the first subframe includes allocating, by the base station within the time period corresponding to the time domain resource after the third time domain resource of the first subframe, the first uplink resource to the second UE based on the uplink resource request message and first configuration information that is pre-agreed between the base station and the second UE. The receiving, by the base station on a second time domain resource of the second subframe, uplink data sent by the second UE by using the first uplink resource based on the second downlink control information includes receiving, by the base station on the second time domain resource of the second subframe and based on the first configuration information, the uplink data sent by the second UE by using the first uplink resource based on the first configuration information. The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the base station allocates the uplink resource to the UE based on the pre-agreed configuration information. In addition, before the base station allocates the uplink resource, the UE may process, in advance based on the configuration information, the uplink data needing to be sent. In this way, the UE can send the processed uplink data at a lower latency after receiving information indicating the uplink resource. In addition, the uplink resource request message received by the base station may include only identification information of the UE. Therefore, transmission resources can be reduced.

In a possible implementation, the uplink resource request message further includes second configuration information. The allocating, by the base station, a first uplink resource to the second UE based on the uplink resource request message within a time period corresponding to a time domain resource after the third time domain resource of the first subframe includes allocating, by the base station, the first uplink resource to the second UE based on the second configuration information within the time period corresponding to the time domain resource after the third time domain resource of the first subframe. The receiving, by the base station on a second time domain resource of the second subframe, uplink data sent by the second UE by using the first uplink resource based on the second downlink control information includes receiving, by the base station on the second time domain resource of the second subframe and based on the second configuration information, the uplink data sent by the second UE by using the first uplink resource based on the second configuration information. The second configuration information includes at least one of the following information, including a cell radio network temporary identifier (C-RNTI) of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the base station may allocate the uplink resource to the UE based on some configuration information carried in the uplink resource request message of the UE and some of the configuration information that is pre-agreed between the base station and the UE. In addition, before the base station allocates the uplink resource, the UE may process, in advance based on the some configuration information carried in the uplink resource request message and the some configuration information that is pre-agreed between the base station and the UE, the uplink data needing to be sent. In this way, the UE can send the processed uplink data at a lower latency after receiving the information indicating the uplink resource, and flexibility of allocating the uplink resource to the UE by the base station is improved by the base station.

According to a second aspect, the present invention provides a communication method, including sending, by a base station, first downlink control information to first user equipment UE on a first time domain resource of a first subframe, receiving, by the base station on a second time domain resource of the first subframe, first uplink data sent by the first UE based on the first downlink control information, and receiving, by the base station on a third time domain resource of the first subframe, an uplink resource request message sent by second UE, where the first time domain resource of the first subframe is located before the second time domain resource and the third time domain of the first subframe, the first downlink control information includes first resource indication information, the first resource indication information is used to indicate a first uplink resource to be used by the first UE to send the first uplink data, and the uplink resource request message includes identification information of the second UE.

In the communication method, the base station not only may send downlink control information to another UE and receive uplink data in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

In a possible implementation, the communication method further includes receiving, by the base station, uplink control information within a time period corresponding to a fourth time domain resource of the first subframe, where the fourth time domain resource of the first subframe is located after the second time domain resource of the first subframe.

In the communication method, the base station may further receive, in the first subframe, uplink control information sent by the another UE.

In a possible implementation, the third time domain resource of the first subframe is located before the fourth time domain resource of the first subframe.

In the communication method, the base station receives the uplink resource request message from the UE before receiving the uplink control message from the another UE, that is, before a non-end time domain resource of the first subframe, so that the base station can allocate the uplink resource to the UE within a time period corresponding to a time domain resource after the third time domain resource of the first subframe. That is, the base station can allocate the uplink resource to the UE at an ultra low latency. In addition, because the base station receives the uplink resource request message from the UE and the uplink control information from the another UE on different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes allocating, by the base station, a first uplink resource to the second UE based on the uplink resource request message within a time period corresponding to a time domain resource after the third time domain resource of the first subframe, and sending, by the base station, second downlink control information to the second UE on a first time domain resource of a second subframe, where the second downlink control information includes second resource indication information, and the second resource indication information is used to indicate the first uplink resource.

In the communication method, the base station allocates the uplink resource to the UE within the time period corresponding to the time domain resource after the third time domain resource of the first subframe, so that the base station can allocate the uplink resource to the UE at an ultra low latency. In addition, because the base station receives the uplink resource request message from the UE and the uplink control information from the another UE on the different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes receiving, by the base station on a second time domain resource of the second subframe, uplink data sent by the second UE by using the first uplink resource based on the second downlink control information.

Because first uplink resource indicated by second downlink control information is allocated by the base station to the UE in a case of an ultra low latency and ultra high reliability, ultra-low-latency ultra-reliable communication is realized when the base station receives the uplink data sent by the UE by using the first uplink resource.

In a possible implementation, the communication method further includes sending, by the base station, third downlink control information to the second UE on a first time domain resource of a third subframe, where the third downlink control information includes second reception status indication information, and the second reception status indication information is used to indicate a reception status of the uplink data.

In the communication method, the base station may send, to the UE, a reception status that is in the base station and that is of the uplink data sent by the UE, so that the base station and the UE can perform subsequent communication based on the reception status.

In a possible implementation, the allocating, by the base station, a first uplink resource to the second UE based on the uplink resource request message within a time period corresponding to a time domain resource after the third time domain resource of the first subframe includes allocating, by the base station within the time period corresponding to the time domain resource after the third time domain resource of the first subframe, the first uplink resource to the second UE based on the uplink resource request message and first configuration information that is pre-agreed between the base station and the second UE. The receiving, by the base station on a second time domain resource of the second subframe, uplink data sent by the second UE by using the first uplink resource based on the second downlink control information includes receiving, by the base station on the second time domain resource of the second subframe and based on the first configuration information, the uplink data sent by the second UE by using the first uplink resource based on the first configuration information. The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the base station allocates the uplink resource to the UE based on the pre-agreed configuration information. In addition, before the base station allocates the uplink resource, the UE may process, in advance based on the configuration information, the uplink data needing to be sent. In this way, the UE can send the processed uplink data at a lower latency after receiving information indicating the uplink resource. In addition, the uplink resource request message received by the base station may include only identification information of the UE. Therefore, transmission resources can be reduced.

In a possible implementation, the uplink resource request message further includes second configuration information. The allocating, by the base station, a first uplink resource to the second UE based on the uplink resource request message within a time period corresponding to a time domain resource after the third time domain resource of the first subframe includes allocating, by the base station, the first uplink resource to the second UE based on the second configuration information within the time period corresponding to the time domain resource after the third time domain resource of the first subframe. The receiving, by the base station on a second time domain resource of the second subframe, uplink data sent by the second UE by using the first uplink resource based on the second downlink control information includes receiving, by the base station on the second time domain resource of the second subframe and based on the second configuration information, the uplink data sent by the second UE by using the first uplink resource based on the second configuration information. The second configuration information includes at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the base station may allocate the uplink resource to the UE based on some configuration information carried in the uplink resource request message of the UE and some of the configuration information that is pre-agreed between the base station and the UE. In addition, before the base station allocates the uplink resource, the UE may process, in advance based on the some configuration information carried in the uplink resource request message and the some configuration information that is pre-agreed between the base station and the UE, the uplink data needing to be sent. In this way, the UE can send the processed uplink data at a lower latency after receiving the information indicating the uplink resource, and flexibility of allocating the uplink resource to the UE by the base station is improved by the base station.

According to a third aspect, the present invention provides a communication method, including generating, by UE, an uplink resource request message, and sending, by the UE, the uplink resource request message to a base station on a third time domain resource of a first subframe, where the first subframe includes a first time domain resource, a second time domain resource, and the third time domain resource, the first time domain resource of the first subframe is located before the second time domain resource of the first subframe, the second time domain resource of the first subframe is located before the third time domain resource of the first subframe, the first time domain resource of the first subframe is used by the base station to send first downlink control information, the second time domain resource of the first subframe is used by the base station to send downlink data, the first downlink control information includes first resource indication information, the first resource indication information is used to indicate a first downlink resource used by base station to send the downlink data to the first UE, and the uplink resource request message includes identification information of the second UE.

In the communication method, the UE may receive an uplink resource request message, sent by the UE, on a fixed third time domain resource of a first subframe in which downlink control information and downlink data can be sent. In this way, the base station can allocate an uplink resource to the UE based on the uplink resource request message, and then the UE can send uplink data to the base station based on the allocated uplink resource.

In a possible implementation, the first subframe further includes a fourth time domain resource. The fourth time domain resource of the first subframe is used by the base station to receive uplink control information, where the uplink control information includes first reception status indication information, and the first reception status indication information is used to indicate a reception status of the downlink data.

In the communication method, further, another UE may send, in the first subframe, uplink control information to the base station.

In a possible implementation, the third time domain resource of the first subframe is located before the fourth time domain resource of the first subframe.

In the communication method, second UE sends the uplink resource request message to the base station before the another UE sends the uplink control message to the base station, that is, before a non-end time domain resource of the first subframe, so that the base station can allocate the uplink resource to the UE within a time period corresponding to a time domain resource after the third time domain resource of the first subframe. That is, the base station can allocate the uplink resource to the UE at an ultra low latency. In addition, because the base station receives the uplink resource request message from the UE and the uplink control information from the another UE on different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes receiving, by the UE, second downlink control information sent by the base station on a first time domain resource of a second subframe. The second downlink control information includes second resource indication information, and the second resource indication information is used to indicate a first uplink resource, where the first uplink resource is an uplink resource allocated by the base station to the UE based on the uplink resource request message within a time period corresponding to a time domain resource after the third time domain resource of the first subframe.

In the communication method, the uplink resource allocated by the base station to the UE and received by the UE is an uplink resource allocated by the base station to the UE within the time period corresponding to the time domain resource after the third time domain resource of the first subframe. In this way, the base station can allocate the uplink resource to the UE at an ultra low latency. In addition, because the uplink resource is allocated by the base station when the base station receives the uplink resource request message from the UE and the uplink control information from the another UE on the different time domain resources, interference of the uplink control information of the another UE to the uplink resource request message can be avoided, thereby realizing communication having higher reliability.

In a possible implementation, the communication method further includes sending, by the UE, uplink data to the base station on a second time domain resource of the second subframe by using the first uplink resource based on the second downlink control information.

Because the first uplink resource indicated by the second downlink control information is allocated by the base station in a case of an ultra low latency and ultra high reliability, ultra-low-latency ultra-reliable communication is realized when the UE sends the uplink data to the base station by using the first uplink resource.

In a possible implementation, the communication method further includes receiving, by the UE on a first time domain resource of a third subframe, third downlink control information sent by the base station, where the third downlink control information includes second reception status indication information, and the second reception status indication information is used to indicate a reception status of the uplink data.

In the communication method, the UE may receive, from the base station, a reception status that is in the base station and that is of the uplink data sent by the UE, so that the UE and the base station can perform subsequent communication based on the reception status.

In a possible implementation, the sending, by the UE, uplink data to the base station on a second time domain resource of the second subframe by using the first uplink resource based on the second downlink control information includes sending, by the UE, the uplink data to the base station on the second time domain resource of the second subframe by using the first uplink resource based on first configuration information that is pre-agreed between the UE and the base station. The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, before the base station allocates the uplink resource, the UE may process, in advance based on pre-agreed configuration information between the base station and the UE, the uplink data needing to be sent, so that the UE can send the processed uplink data at a lower latency after receiving information indicating the uplink resource. In addition, the uplink resource request message sent by the UE to the base station may include only identification information of the UE. Therefore, transmission resources can be reduced.

In a possible implementation, the uplink resource request message further includes second configuration information. The sending, by the UE, uplink data to the base station on a second time domain resource of the second subframe by using the first uplink resource based on the second downlink control information includes sending, by the UE, the uplink data to the base station on the second time domain resource of the second subframe by using the first uplink resource based on the second configuration information. The second configuration information includes at least one of the following information, including a cell radio network temporary identifier (C-RNTI) of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the UE may add some configuration information to the uplink resource request message. In this case, the base station may allocate the uplink resource to the UE based on the some configuration information carried in the uplink resource request message of the UE and some of the configuration information that is pre-agreed between the base station and the UE. In addition, before the base station allocates the uplink resource, the UE may process, in advance based on the some configuration information carried in the uplink resource request message and the some configuration information that is pre-agreed between the base station and the UE, the uplink data needing to be sent. In this way, the UE can send the processed uplink data at a lower latency after receiving the information indicating the uplink resource, and flexibility of allocating the uplink resource to the UE by the base station is improved by the base station.

According to a fourth aspect, the present invention provides a communication method, including generating, by user equipment UE, an uplink resource request message, and sending, by the UE, the uplink resource request message to a base station on a third time domain resource of a first subframe, where the first subframe includes a first time domain resource, a second time domain resource, and the third time domain resource, the first time domain resource of the first subframe is located before the second time domain resource and the third time domain of the first subframe, the first time domain resource of the first subframe is used by the base station to send first downlink control information, the second time domain resource of the first subframe is used by another UE to send first uplink data, the first downlink control information includes first resource indication information, the first resource indication information is used to indicate a first uplink resource to be used by the another UE to send the first uplink data, and the uplink resource request message includes identification information of the UE.

In the communication method, the UE may receive an uplink resource request message, sent by the UE, on a fixed third time domain resource of a first subframe in which downlink control information and uplink data can be sent. In this way, the base station can allocate an uplink resource to the UE based on the uplink resource request message, and then the UE can send uplink data to the base station based on the allocated uplink resource.

In a possible implementation, the first subframe further includes a fourth time domain resource. The fourth time domain resource of the first subframe is located after the second time domain resource of the first subframe, and the fourth time domain resource of the first subframe is used by the base station to receive uplink control information.

In the communication method, further, another UE may send, in the first subframe, uplink control information to the base station.

In a possible implementation, the third time domain resource of the first subframe is located before the fourth time domain resource of the first subframe.

In the communication method, second UE sends the uplink resource request message to the base station before the another UE sends the uplink control message to the base station, that is, before a non-end time domain resource of the first subframe, so that the base station can allocate the uplink resource to the UE within a time period corresponding to a time domain resource after the third time domain resource of the first subframe. That is, the base station can allocate the uplink resource to the UE at an ultra low latency. In addition, because the base station receives the uplink resource request message from the UE and the uplink control information from the another UE on different time domain resources, interference of the uplink control information of the another UE to the uplink resource request message can be avoided. In this way, the uplink resource can be more reliably allocated to the UE based on the uplink resource request message. That is, communication having higher reliability can be realized.

In a possible implementation, the communication method further includes receiving, by the UE, second downlink control information sent by the base station on a first time domain resource of a second subframe. The second downlink control information includes second resource indication information, and the second resource indication information is used to indicate a first uplink resource, where the first uplink resource is an uplink resource allocated by the base station to the UE based on the uplink resource request message within a time period corresponding to a time domain resource after the third time domain resource of the first subframe.

In the communication method, the uplink resource allocated by the base station to the UE and received by the UE is an uplink resource allocated by the base station to the UE within the time period corresponding to the time domain resource after the third time domain resource of the first subframe. In this way, the base station can allocate the uplink resource to the UE at an ultra low latency. In addition, because the uplink resource is allocated by the base station when the base station receives the uplink resource request message from the UE and the uplink control information from the another UE on the different time domain resources, interference of the uplink control information of the another UE to the uplink resource request message can be avoided, thereby realizing communication having higher reliability.

In a possible implementation, the communication method further includes sending, by the UE, uplink data to the base station on a second time domain resource of the second subframe by using the first uplink resource based on the second downlink control information.

Because the first uplink resource indicated by the second downlink control information is allocated by the base station in a case of an ultra low latency and ultra high reliability, ultra-low-latency ultra-reliable communication is realized when the UE sends the uplink data to the base station by using the first uplink resource.

In a possible implementation, the communication method further includes receiving, by the UE on a first time domain resource of a third subframe, third downlink control information sent by the base station, where the third downlink control information includes second reception status indication information, and the second reception status indication information is used to indicate a reception status of the uplink data.

In the communication method, the UE may receive, from the base station, a reception status that is in the base station and that is of the uplink data sent by the UE, so that the UE and the base station can perform subsequent communication based on the reception status.

In a possible implementation, the sending, by the UE, uplink data to the base station on a second time domain resource of the second subframe by using the first uplink resource based on the second downlink control information includes sending, by the UE, the uplink data to the base station on the second time domain resource of the second subframe by using the first uplink resource based on first configuration information that is pre-agreed between the UE and the base station. The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, before the base station allocates the uplink resource, the UE may process, in advance based on pre-agreed configuration information between the base station and the UE, the uplink data needing to be sent, so that the UE can send the processed uplink data at a lower latency after receiving information indicating the uplink resource. In addition, the uplink resource request message sent by the UE to the base station may include only identification information of the UE. Therefore, transmission resources can be reduced.

In a possible implementation, the uplink resource request message further includes second configuration information. The sending, by the UE, uplink data to the base station on a second time domain resource of the second subframe by using the first uplink resource based on the second downlink control information includes sending, by the UE, the uplink data to the base station on the second time domain resource of the second subframe by using the first uplink resource based on the second configuration information. The second configuration information includes at least one of the following information, including a cell radio network temporary identifier C-RNTI of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

In the communication method, the UE may add some configuration information to the uplink resource request message. In this case, the base station may allocate the uplink resource to the UE based on the some configuration information carried in the uplink resource request message of the UE and some of the configuration information that is pre-agreed between the base station and the UE. In addition, before the base station allocates the uplink resource, the UE may process, in advance based on the some configuration information carried in the uplink resource request message and the some configuration information that is pre-agreed between the base station and the UE, the uplink data needing to be sent. In this way, the UE can send the processed uplink data at a lower latency after receiving the information indicating the uplink resource, and flexibility of allocating the uplink resource to the UE by the base station is improved by the base station.

According to a fifth aspect, the present invention provides a base station. The base station includes a module configured to perform the communication method according to the first aspect or any possible implementation of the first aspect. The communication method may be implemented by hardware, or may be implemented by hardware executing corresponding software. The hardware or software includes one or more modules corresponding to the foregoing function. Optionally, the base station may be a network side device, for example, a base station.

According to a sixth aspect, the present invention provides a base station. The base station includes a module configured to perform the communication method according to the second aspect or any possible implementation of the second aspect. The communication method may be implemented by hardware, or may be implemented by hardware executing corresponding software. The hardware or software includes one or more modules corresponding to the foregoing function. Optionally, the base station may be a network side device, for example, a base station.

According to a seventh aspect, the present invention provides UE. The UE includes a module configured to perform the communication method according to the third aspect or any possible implementation of the third aspect. The communication method may be implemented by hardware, or may be implemented by hardware executing corresponding software. The hardware or software includes one or more modules corresponding to the foregoing function.

According to an eighth aspect, the present invention provides UE. The UE includes a module configured to perform the communication method according to the fourth aspect or any possible implementation of the fourth aspect. The communication method may be implemented by hardware, or may be implemented by hardware executing corresponding software. The hardware or software includes one or more modules corresponding to the foregoing function.

According to a ninth aspect, the present invention provides a base station, including a receiver, a transmitter, a processor, and a memory. The memory is configured to store code, the processor is configured to execute the code stored in the memory, and the receiver and the transmitter are configured to communicate with another device. When the code is executed, the processor invokes the receiver and the transmitter to implement the communication method according to the first aspect or any possible implementation of the first aspect.

According to a tenth aspect, the present invention provides a base station, including a receiver, a transmitter, a processor, and a memory. The memory is configured to store code, the processor is configured to execute the code stored in the memory, and the receiver and the transmitter are configured to communicate with another device. When the code is executed, the processor invokes the receiver and the transmitter to implement the communication method according to the second aspect or any possible implementation of the second aspect.

According to an eleventh aspect, the present invention provides UE, including a transmitter, a processor, and a memory. The memory is configured to store code, the processor is configured to execute the code stored in the memory, and the receiver and the transmitter are configured to communicate with another device. When the code is executed, the processor invokes the transmitter to implement the communication method according to the third aspect or any possible implementation of the third aspect.

Optionally, the UE may further include a receiver, configured to receive, when being invoked by the processor, a message sent by the another communications device.

According to a twelfth aspect, the present invention provides UE, including a transmitter, a processor, and a memory. The memory is configured to store code, the processor is configured to execute the code stored in the memory, and the transmitter is configured to communicate with another device. When the code is executed, the processor invokes the receiver and the transmitter to implement the communication method according to the fourth aspect or any possible implementation of the fourth aspect.

Optionally, the UE may further include a receiver, configured to receive, when being invoked by the processor, a message sent by the another communications device.

According to a thirteenth aspect, the present invention provides a communications system, including the base station according to the ninth aspect and the UE according to the eleventh aspect.

According to a fourteenth aspect, the present invention provides a communications system, including the base station according to the tenth aspect and the UE according to the twelfth aspect.

According to a fifteenth aspect, the present invention provides a computer-readable medium. The computer-readable medium stores program code to be executed by a base station. The program code includes an instruction used to perform the communication method according to the first aspect or any possible implementation of the first aspect.

According to a sixteenth aspect, the present invention provides a computer-readable medium. The computer-readable medium stores program code to be executed by a base station. The program code includes an instruction used to perform the communication method according to the second aspect or any possible implementation of the second aspect.

According to a seventeenth aspect, the present invention provides a computer-readable medium. The computer-readable medium stores program code to be executed by UE. The program code includes an instruction used to perform the communication method according to the third aspect or any possible implementation of the third aspect.

According to an eighteenth aspect, the present invention provides a computer-readable medium. The computer-readable medium stores program code to be executed by UE. The program code includes an instruction used to perform the communication method according to the fourth aspect or any possible implementation of the fourth aspect.

According to a nineteenth aspect, the present invention provides a frame structure. The frame structure includes a first time domain resource, a second time domain resource, a third time domain resource, and a fourth time domain resource. The first time domain resource is located before the second time domain resource, and the second time domain resource is located before the third time domain resource. The first time domain resource is used by a base station to send first downlink control information, the second time domain resource is used by the base station to send downlink data, the third time domain resource is used by UE to send an uplink resource request message, and the fourth time domain resource is used by the UE to send uplink control information.

According to a twentieth aspect, the present invention provides a frame structure. The frame structure includes a first time domain resource, a second time domain resource, and a third time domain resource. The first time domain resource is located before the second time domain resource and the third time domain. The first time domain resource is used by a base station to send first downlink control information, the second time domain resource is used by UE to send uplink data based on the first downlink control information, and the third time domain resource is used by the UE to send an uplink resource request message.

Optionally, the frame structure further includes a fourth time domain resource. The fourth time domain resource is after the second time domain resource, and the fourth time domain resource is used by the UE to send uplink control information.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 9 is a schematic structural diagram of a subframe according to another embodiment of the present invention;

FIG. 10 is a schematic structural diagram of a base station according to an embodiment of the present invention;

FIG. 11 is a schematic structural diagram of a base station according to another embodiment of the present invention;

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For convenience of understanding, an example of a diagram of an architecture of a communications system that can implement a communication method in the embodiments of the present invention is first described from an overall angle. An apparatus in FIG. 1 may be hardware, software divided based on a function, or a combination thereof.

Figure 1:
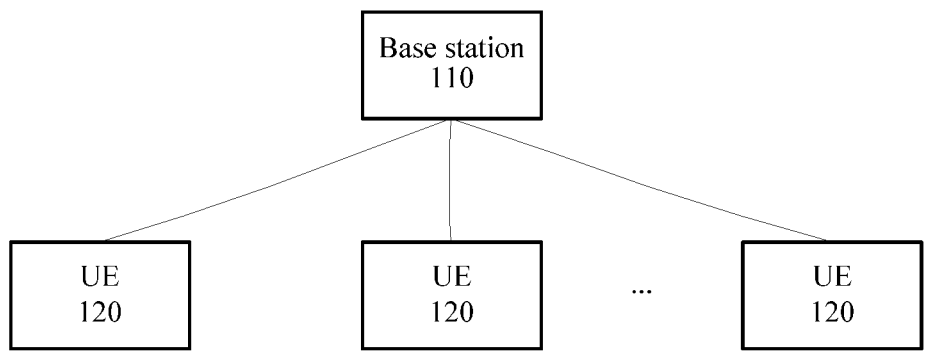
FIG. 1 is a schematic architectural diagram of a communications system that can apply a communication method according to an embodiment of the present invention.

The communications system shown in FIG. 1 may be a 5G NR communications system. Further, it should be understood that, the embodiments of the present invention are not limited to the system architecture shown in FIG. 1.

In the communications system shown in FIG. 1, a base station 110 is responsible for communicating with a plurality of UEs 120. The UE and the base station may perform uplink communication or downlink communication and use self-contained subframe structures.

Specifically, when the UE and the base station perform uplink transmission, an uplink-dominant self-contained subframe structure may be used. When the base station and the UE perform downlink transmission, a downlink-dominant self-contained subframe structure may be used.

The base station in the embodiments of the present invention may be a base transceiver station (Base Transceiver Station, BTS) in a Global System for Mobile Communications (Global System for Mobile Communications, GSM) or a Code Division Multiple Access (Code Division Multiple Access, CDMA) system, a NodeB (NodeB) in a Wideband Code Division Multiple Access (Wideband Code Division Multiple Access, WCDMA) system, an evolved NodeB (Evolved NodeB, eNB or eNodeB) in an LTE system, a base station device or a micro base station device in a future 5G network or 5G NR network, or the like. This is not limited in the present invention.

The UE in the embodiments of the present invention may communicate with one or more core networks (Core Network) by using a radio access network (Radio Access Network, RAN). The UE may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The UE may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or the like.

Figure 2:
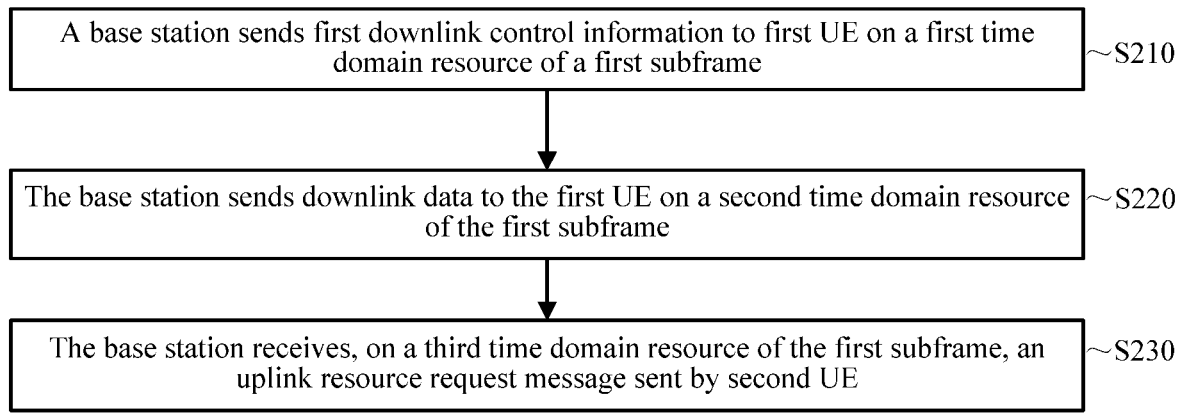
FIG. 2 is a schematic flowchart of a communication method according to an embodiment of the present invention.

When the base station and the UE in the communications system in FIG. 1 use self-contained subframe structures for communication, a schematic flowchart of a communication method in which the UE sends an uplink resource request message to the base station is shown in FIG. 2. A downlink-dominant self-contained subframe structure is mainly used in the communication method shown in FIG. 2.

It should be understood that, FIG. 2 shows steps or operations of the communication method, but the steps or operations are merely examples. In this embodiment of the present invention, other operations or variants of the operations in FIG. 2 may further be performed. In addition, the steps in FIG. 2 may be performed in an order different from that presented in FIG. 2, and the operations in FIG. 2 may not necessarily be all performed.

S210. The base station sends first downlink control information to first UE on a first time domain resource of a first subframe.

S220. The base station sends downlink data to the first UE on a second time domain resource of the first subframe.

S230. The base station receives, on a third time domain resource of the first subframe, an uplink resource request message sent by second UE.

The first time domain resource is located before the second time domain resource, the second time domain resource is located before the third time domain resource, the first downlink control information includes first resource indication information, the first resource indication information is used to indicate a first downlink resource used by the base station to send the downlink data, and the uplink resource request message includes identification information of the second UE.

Certainly, the first downlink control information may further carry other information, and the uplink resource request message may further include other information. This is not limited in the present invention.

On a UE side, a communication method that is performed by the first UE and that corresponds to the communication method shown in FIG. 2 includes receiving, by the first UE on the first time domain resource of the first subframe, the first downlink control information sent by the base station, and receiving, by the first UE on the second time domain resource of the first subframe, the downlink data sent by the base station by using the downlink resource that is indicated by the first resource indication information in the first downlink control information.

A communication method that is performed by the second UE and that corresponds to the communication method shown in FIG. 2 includes generating, by the second UE, the uplink resource request message, and sending, by the second UE, the uplink resource request message to the base station on the third time domain resource of the first subframe.

In this embodiment of the present invention, the base station sends the first downlink control information on the first time domain resource of the first subframe. Correspondingly, the first UE receives, on the first time domain of the first subframe, the first downlink control information sent by the base station. Then, the base station sends, on the second time domain resource after the first time domain resource of the first subframe, the downlink data by using the downlink resource that is indicated by the first resource indication information included in the first downlink control information. Correspondingly, the first UE receives, on the second time domain resource of the first subframe, the downlink data sent by the base station. Next, the second UE sends the uplink resource request message to the base station on the third time domain resource after the second time domain resource of the first subframe. Correspondingly, the base station receives, on the third time domain resource of the first subframe, the uplink resource request message sent by the second UE.

That is, in this embodiment of the present invention, the second UE may send the uplink resource request message to the base station on the fixed third time domain resource of the first subframe, so that the base station can allocate an uplink resource to the second UE based on the uplink resource request message, and then the second UE can send uplink data by using the uplink resource allocated by the base station to the second UE.

Optionally, one GP may be included between a moment at which the base station sends the downlink data and a moment at which the base station receives the uplink resource request message sent by the UE.

In the communications system, duration of the GP needs to include two parts. A first part is a transformation time, which is denoted as $T_{transform}$, from a moment at which the UE receives a message from the base station to a moment at which the UE sends a message to the base station. A second part is a time period, which is denoted as $T_{round}$, required for transmitting the message by the base station to the UE and sending the message by the UE to the base station. For a case in which the base station sends a signal to a plurality of UEs, to ensure that signals sent by different UEs can reach the base station at a same moment, there are different uplink timing advances $T_{advance}$ for different UEs. If a message arrives at UE from the base station for a relatively long time, the UE uses a relatively large uplink timing advance. In other words, the UE can send a signal in advance to compensate a time loss between the base station and the UE, thereby realizing signal synchronization.

Optionally, after receiving the downlink data sent by the base station, the first UE may send uplink control information to the base station on a fourth time domain resource of the first subframe. The uplink control information is used to indicate a reception status that is in the first UE and that is of the downlink data sent by the base station on the second time domain resource of the first subframe. If the first UE correctly receives the downlink data sent by the base station on the second time domain resource of the first subframe, the first UE may send uplink control information including ACK information to the base station. If the first UE does not correctly receive or does not receive the downlink data sent by the base station on the second time domain resource of the first subframe, the first UE may send uplink control information including NACK information or other similar information to the base station.

Corresponding to this, the communication method shown in FIG. 2 may further include receiving, by the base station on the fourth time domain resource of the first subframe, the uplink control information sent by the first UE. The uplink control information includes first reception status indication information, and the first reception status indication information is used to indicate the reception status of the downlink data.

Certainly, optionally, the fourth time domain resource of the first subframe may be idle, and is not used by the base station or any UE. Alternatively, the third time domain resource of the first subframe may be referred to as a part of the fourth time domain resource of the first subframe.

Optionally, the third time domain resource of the first subframe may be located before the fourth time domain resource of the first subframe or after the fourth time domain resource of the first subframe, or may be a part of the fourth time domain resource of the first subframe.

When the third time domain resource of the first subframe is located before the fourth time domain resource, that is, when the third time domain resource is a non-end time domain resource of the first subframe, the base station may allocate the uplink resource to the second UE based on the uplink resource request message of the second UE within a time period corresponding to a time domain resource after the third time domain resource of the first subframe. For example, the base station may allocate the uplink resource to the second UE based on the uplink resource request message of the second UE within a time period corresponding to the fourth time domain resource of the first subframe. Certainly, the base station may alternatively allocate the uplink resource to the second UE based on the uplink resource request message of the second UE within a GP between the first subframe and a second subframe, or within a time period corresponding to the fourth time domain resource and within a GP between the first subframe and a second subframe.

After allocating the uplink resource to the second UE based on the uplink resource request message of the second UE within the time period corresponding to the time domain resource after the third time domain resource of the first subframe, the base station may send, to the second UE on a first time domain resource of the second subframe, downlink control information (for convenience of description, the downlink control information is referred to as second downlink control information) including indication information used to indicate the uplink resource. The second subframe may be the $1^{st}$ subframe after the first subframe.

After receiving the downlink control information sent by the base station on the first time domain resource of the second subframe, the second UE may send, on a second time domain resource after the first time domain resource of the second subframe, the uplink data to the base station by using the uplink resource indicated by the downlink control information. Correspondingly, the base station may receive, on the second time domain resource of the second subframe, the uplink data sent by the second UE.

In this case, because the base station has allocated the uplink resource to the second UE based on the uplink resource request message of the second UE within the time period corresponding to the time domain resource after the third time domain resource of the first subframe and/or within the GP between the first subframe and the second subframe, the base station can quickly send information about the allocated uplink resource to the second UE in the second subframe. In this way, the second UE can send, in the second subframe, the uplink data to the base station by using the uplink resource allocated by the base station to the second UE. That is, the second UE can realize low-latency communication. In addition, because the third time domain resource used by the second UE to send the uplink resource request message and the fourth time domain resource used by another UE to send the uplink control information are different time domain resources, the uplink resource request message sent by the second UE is not affected by the uplink control information sent by the another UE. In this way, the second UE can realize high-reliability communication.

In other words, the base station and the second UE can realize ultra-reliable ultra-low-latency communication (Ultra-Reliable Ultra-Low-Latency Communication, URLLC).

Optionally, the another UE, for example, the first UE, may send the uplink control information, for example, send CSI information, to the base station on a time domain resource after the second time domain resource of the second subframe.

Optionally, after receiving, on the second time domain resource of the second subframe, the uplink data sent by the second UE, the base station may send third downlink control information to the second UE on a first time domain resource of a third subframe after the second subframe. Correspondingly, the second UE receives, on the first time domain resource of the third subframe, the third downlink control information sent by the base station. The third downlink control information includes second reception status indication information, and the second reception status indication information is used to indicate a reception status that is in the base station and that is of the uplink data sent by the second UE. The reception status may be an ACK or a NACK.

Optionally, if the base station sends a NACK to the second UE on the first time domain resource of the third subframe, the second UE may continue to send, under scheduling of the base station, the uplink data to the base station on a time domain resource after the first time domain resource of the third subframe.

Figure 3:
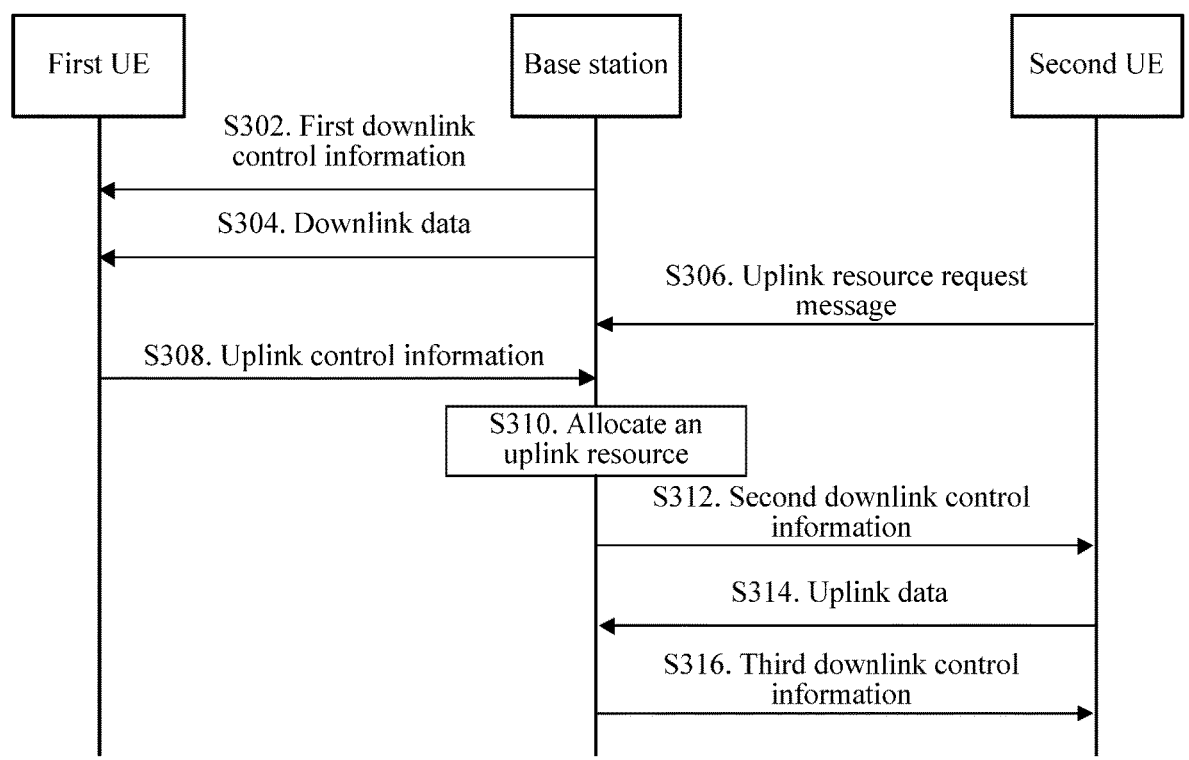
FIG. 3 is a schematic interaction flowchart of a communication method according to an embodiment of the present invention.

In conclusion, in the communication method shown in FIG. 2, a schematic flowchart of interaction among the base station, the first UE, and the second UE is shown in FIG. 3.

S302. The base station sends the first downlink control information to the first UE on the first time domain resource of the first subframe. The first downlink control information carries indication information used to indicate the downlink resource to be used by the base station to send the downlink data to the first UE.

S304. The base station sends, on the second time domain resource of the first subframe, the downlink data to the first UE by using the downlink resource indicated by the first downlink control information.

S306. The second UE sends the uplink resource request message to the base station on the third time domain resource of the first subframe.

S308. The first UE sends the uplink control information to the base station on the fourth time domain resource of the first subframe, and feeds back, to the base station, the reception status that is in the first UE and that is of the downlink data sent by the base station on the second time domain resource of the first subframe.

S310. The base station allocates the uplink resource to the second UE based on the uplink resource request message of the second UE within the time period corresponding to the time domain resource after the third time domain resource of the first subframe.

S312. The base station sends the second downlink control information to the second UE on the first time domain resource of the second subframe, where the second downlink control information carries the indication information used to indicate the uplink resource.

S314. The second UE sends, on the second time domain resource of the second subframe, the uplink data to the base station by using the uplink resource indicated by the second downlink control information.

S316. The base station sends the third downlink control information to the second UE on the first time domain resource of the third subframe, where the third downlink control information carries the second reception status indication information used to indicate the reception status that is in the base station and that is of the uplink data sent by the second UE on the second time domain resource of the second subframe.

In the communication method shown in FIG. 3, the second UE sends the uplink resource request message to the base station on the third time domain before the fourth time domain resource of the first subframe, so that the base station has time to allocate the uplink resource to the second UE within the time period corresponding to the fourth time domain resource of the first subframe, and the uplink resource request message of the second UE is not affected by the uplink control information that may be sent by the another UE on the fourth time domain resource of the first subframe. In this way, the second UE and the base station can realize ultra-reliable ultra-low-latency communication.

Figures 4, 5:
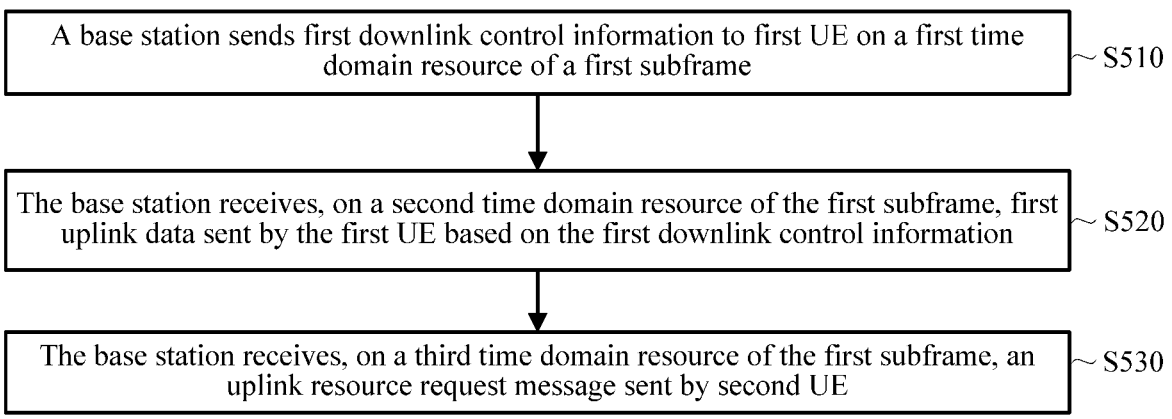
FIG. 4 is a schematic structural diagram of a subframe according to an embodiment of the present invention.
FIG. 5 is a schematic flowchart of a communication method according to another embodiment of the present invention.

A schematic structural diagram of the three subframes, namely, the first subframe, the second subframe, and the third subframe, corresponding to the communication method shown in FIG. 3 is shown in FIG. 4.

As shown in FIG. 4, the first subframe sequentially includes the first time domain resource, the second time domain resource, the third time domain resource, and the fourth time domain resource in chronological order, and a GP exists between the second time domain resource and the third time domain resource. The second subframe sequentially includes the first time domain resource, the second time domain resource, and the third time domain resource in chronological order, and a GP exists both between the first time domain resource and the second time domain resource and between the second time domain resource and the third time domain resource. The third subframe includes the first time domain resource and another time domain resource. Optionally, a GP may exist between the first subframe and the second subframe.

The first time domain resource of the first subframe is used by the base station to send downlink control information to UE, where the downlink control information may carry DL grant information used to indicate a downlink resource. The second time domain resource of the first subframe is used by the base station to send downlink data (Down Link data, DL data) to UE based on a downlink resource indicated by downlink control information. The third time domain resource of the first subframe is used by UE to send an uplink resource request message (an URLLC request) to the base station. The fourth time domain resource of the first subframe may be used by UE to send uplink control information (UL control) to the base station, such as CSI or information for feeding back a reception status of downlink data. It should be noted that, herein, the UEs related to the first subframe may be same UE or different UEs.

The first time domain resource of the second subframe is used by the base station to send downlink control information to UE, where the downlink control information carries UL grant information used to indicate an uplink resource. The second time domain resource of the second subframe is used by UE to send uplink data (Up Link data, UL data) to the base station by using an uplink resource indicated by downlink control information. The third time domain resource of the second subframe is used by UE to send uplink control information to the base station, such as CSI or information for feeding back a reception status of downlink data. Optionally, a time domain resource used by another UE to send an uplink resource request message may further exist between the second time domain and the third time domain of the second subframe.

The first time domain resource of the third subframe is used by the base station to send a reception status of uplink data of UE to the UE. The another time domain resource of the third subframe may have a same function as the second time domain resource of the first subframe or the second subframe, and may be used to transmit other information. Details are not described in the present invention again.

When the base station and the UE in the communications system in FIG. 1 use the self-contained subframe structures for communication, a schematic flowchart of another communication method in which the UE sends an uplink resource request message to the base station is shown in FIG. 5. An uplink-dominant self-contained subframe structure is mainly used in the communication method shown in FIG. 5.

It should be understood that, FIG. 5 shows steps or operations of the communication method, but the steps or operations are merely examples. In this embodiment of the present invention, other operations or variants of the operations in FIG. 5 may further be performed. In addition, the steps in FIG. 5 may be performed in an order different from that presented in FIG. 5, and the operations in FIG. 5 may not necessarily be all performed.

S510. The base station sends first downlink control information to first UE on a first time domain resource of a first subframe.

S520. The base station receives, on a second time domain resource of the first subframe, first uplink data sent by the first UE based on the first downlink control information.

S530. The base station receives, on a third time domain resource of the first subframe, an uplink resource request message sent by second UE.

The first time domain resource of the first subframe is located before the second time domain resource and the third time domain of the first subframe, the first downlink control information includes first resource indication information, the first resource indication information is used to indicate a first uplink resource to be used by the first UE to send the first uplink data, and the uplink resource request message includes identification information of the second UE.

Certainly, the first downlink control information may further carry other information, and the uplink resource request message may further include other information. This is not limited in the present invention.

On a UE side, a communication method that is performed by the first UE and that corresponds to the communication method shown in FIG. 5 includes receiving, by the first UE on the first time domain resource of the first subframe, the first downlink control information sent by the base station, and sending, by the first UE on the second time domain resource of the first subframe, the uplink data to the base station by using the uplink resource that is indicated by the first resource indication information in the first downlink control information.

A communication method that is performed by the second UE and that corresponds to the communication method shown in FIG. 5 includes generating, by the second UE, the uplink resource request message, and sending, by the second UE, the uplink resource request message to the base station on the third time domain resource of the first subframe.

In this embodiment of the present invention, the base station sends the first downlink control information on the first time domain resource of the first subframe. Correspondingly, the first UE receives, on the first time domain of the first subframe, the first downlink control information sent by the base station. Then, the first UE sends, on the second time domain resource after the first time domain resource of the first subframe, the uplink data to the base station by using the uplink resource that is indicated by the first resource indication information included in the first downlink control information. Correspondingly, the base station receives, on the second time domain resource of the first subframe, the downlink data sent by the first UE. Next, the second UE sends the uplink resource request message to the base station on the third time domain resource after the second time domain resource of the first subframe. Correspondingly, the base station receives, on the third time domain resource of the first subframe, the uplink resource request message sent by the second UE.

That is, in this embodiment of the present invention, the second UE may send the uplink resource request message to the base station on the fixed third time domain resource of the first subframe, so that the base station can allocate an uplink resource to the second UE based on the uplink resource request message, and then the second UE can send uplink data by using the uplink resource allocated by the base station to the second UE.

Optionally, one GP may be included between a moment at which the base station sends the first downlink control information and a moment at which the UE sends the uplink data to the base station.

Optionally, the second time domain resource of the first subframe may be located before the third time domain resource of the first subframe or after the third time domain resource of the first subframe.

Optionally, the first subframe may further include a fourth time domain resource. In this case, on the fourth time domain resource of the first subframe, the first UE or another UE may send uplink control information to the base station, such as CSI or indication information used to indicate a reception status of downlink data that is sent by the base station and that is previously received by the another UE.

Corresponding to this, the communication method shown in FIG. 5 may further include receiving, by the base station on the fourth time domain resource of the first subframe, the uplink control information sent by the first UE or the another UE.

Certainly, optionally, the fourth time domain resource of the first subframe may be idle, and is not used by the base station or any UE. Alternatively, the third time domain resource of the first subframe may be referred to as a part of the fourth time domain resource of the first subframe.

Optionally, the third time domain resource of the first subframe may be located before the fourth time domain resource of the first subframe. Certainly, the third time domain resource of the first subframe may alternatively be located after the fourth time domain resource of the first subframe.

Further, optionally, when the third time domain resource of the first subframe is located before the second time domain resource or the third time domain resource of the first subframe is located after the second time domain resource, and the third time domain resource of the first subframe is located before the fourth time domain resource of the first subframe, after receiving, on the third time domain resource of the first subframe, the uplink resource request message sent by the second UE, the base station may allocate the uplink resource to the second UE based on the uplink resource request message of the second UE within a time period corresponding to a time domain resource after the third time domain resource of the first subframe. Simply, the base station may allocate the uplink resource to the second UE within the time period corresponding to the time domain resource after the third time domain resource of the first subframe. For example, the base station may allocate the uplink resource to the second UE based on the uplink resource request message of the second UE within a time period corresponding to the second time domain resource or the fourth time domain resource of a second subframe. Certainly, the base station may alternatively allocate the uplink resource to the second UE based on the uplink resource request message of the second UE within a GP between the first subframe and the second subframe.

After allocating the uplink resource to the second UE based on the uplink resource request message of the second UE within the time period corresponding to the time domain resource after the third time domain resource of the first subframe, the base station may send, to the second UE on a first time domain resource of the second subframe, downlink control information (for convenience of description, the downlink control information is referred to as second downlink control information) including indication information used to indicate the uplink resource. The second subframe may be the $1^{st}$ subframe after the first subframe.

After receiving the downlink control information sent by the base station on the first time domain resource of the second subframe, the second UE may send, on a second time domain resource after the first time domain resource of the second subframe, the uplink data to the base station by using the uplink resource indicated by the downlink control information. Correspondingly, the base station may receive, on the second time domain resource of the second subframe, the uplink data sent by the second UE.

In this case, because the base station has allocated the uplink resource to the second UE based on the uplink resource request message of the second UE within the time period corresponding to the time domain resource after the third time domain resource of the first subframe, the base station can quickly send information about the allocated uplink resource to the second UE in the second subframe. In this way, the second UE can send, in the second subframe, the uplink data to the base station by using the uplink resource allocated by the base station to the second UE. That is, the second UE can realize low-latency communication. In addition, because the third time domain resource used by the second UE to send the uplink resource request message and the fourth time domain resource used by the another UE to send the uplink control information are different time domain resources, the uplink resource request message sent by the second UE is not affected by the uplink control information sent by the another UE. In this way, the second UE can realize high-reliability communication.

In other words, the base station and the second UE can realize ultra-reliable ultra-low-latency communication.

Optionally, the another UE, for example, the first UE, may send the uplink control information, for example, send CSI information, to the base station on a time domain resource after the second time domain resource of the second subframe.

Optionally, after receiving, on the second time domain resource of the second subframe, the uplink data sent by the second UE, the base station may send third downlink control information to the second UE on a first time domain resource of a third subframe after the second subframe. Correspondingly, the second UE receives, on the first time domain resource of the third subframe, the third downlink control information sent by the base station. The third downlink control information includes second reception status indication information, and the second reception status indication information is used to indicate a reception status that is in the base station and that is of the uplink data sent by the second UE. The reception status may be an ACK or a NACK.

Optionally, if the base station sends a NACK to the second UE on the first time domain resource of the third subframe, the second UE may continue to send, under scheduling of the base station, the uplink data to the base station on a time domain resource after the first time domain resource of the third subframe.

Figure 6:
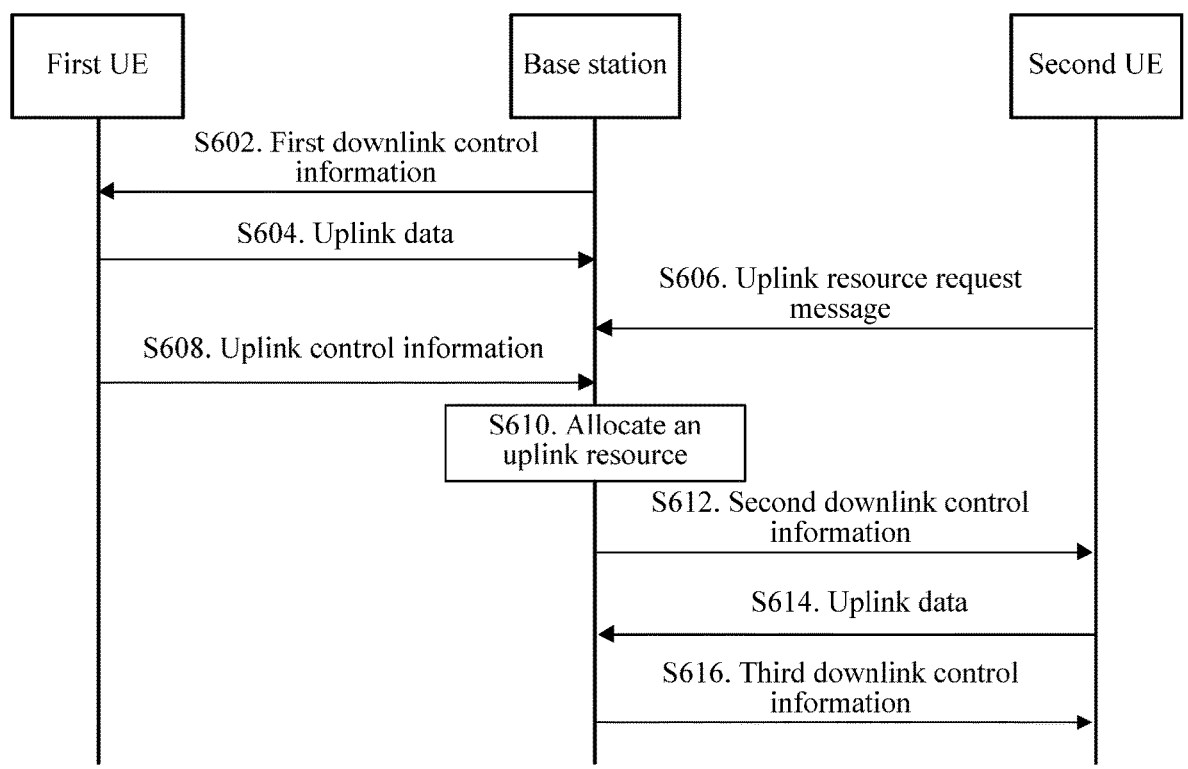
FIG. 6 is a schematic interaction flowchart of a communication method according to another embodiment of the present invention.

In conclusion, in the communication method shown in FIG. 5, a schematic flowchart of interaction among the base station, the first UE, and the second UE is shown in FIG. 6.

S602. The base station sends the first downlink control information to the first UE on the first time domain resource of the first subframe. The first downlink control information carries indication information used to indicate the uplink resource to be used by the first UE to send the uplink data to the base station.

S604. The first UE sends, on the second time domain resource of the first subframe, the uplink data to the base station by using the uplink resource indicated by the first downlink control information.

S606. The second UE sends the uplink resource request message to the base station on the third time domain resource of the first subframe.

S608. The first UE or the another UE sends the uplink control information, for example, CSI, to the base station on the fourth time domain resource of the first subframe.

S610. The base station allocates the uplink resource to the second UE based on the uplink resource request message of the second UE within the time period corresponding to the time domain resource after the third time domain resource of the first subframe. For example, the base station allocates the uplink resource to the second UE based on the uplink resource request message of the second UE within a time period corresponding to the fourth time domain resource of the first subframe.

S612. The base station sends the second downlink control information to the second UE on the first time domain resource of the second subframe, where the second downlink control information carries the indication information used to indicate the uplink resource.

S614. The second UE sends, on the second time domain resource of the second subframe, the uplink data to the base station by using the uplink resource indicated by the second downlink control information.

S616. The base station sends the third downlink control information to the second UE on the first time domain resource of the third subframe, where the third downlink control information carries the second reception status indication information used to indicate the reception status that is in the base station and that is of the uplink data sent by the second UE on the second time domain resource of the second subframe.

In the communication method shown in FIG. 6, the second UE sends the uplink resource request message to the base station on the third time domain before the fourth time domain resource of the first subframe, so that the base station has time to allocate the uplink resource to the second UE within the time period corresponding to the fourth time domain resource of the first subframe, and the uplink resource request message of the second UE is not affected by the uplink control information that may be sent by the another UE on the fourth time domain resource of the first subframe. In this way, the second UE and the base station can realize ultra-reliable ultra-low-latency communication.

Figures 7, 8:
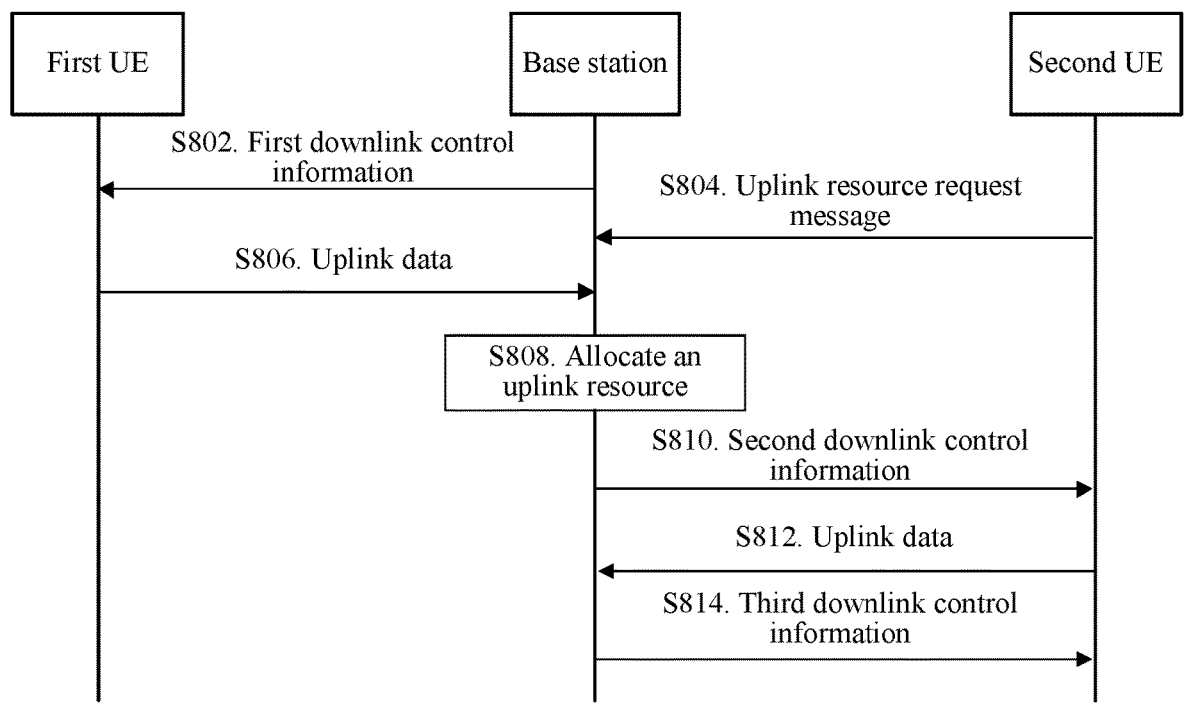
FIG. 7 is a schematic structural diagram of a subframe according to another embodiment of the present invention.
FIG. 8 is a schematic interaction flowchart of a communication method according to another embodiment of the present invention.

A schematic structural diagram of the three subframes, namely, the first subframe, the second subframe, and the third subframe, corresponding to the communication method shown in FIG. 6 is shown in FIG. 7.

As shown in FIG. 7, the first subframe sequentially includes the first time domain resource, the second time domain resource, the third time domain resource, and the fourth time domain resource in chronological order, and a GP exists between the first time domain resource and the second time domain resource. The second subframe sequentially includes the first time domain resource, the second time domain resource, and the third time domain resource in chronological order, and a GP exists both between the first time domain resource and the second time domain resource and between the second time domain resource and the third time domain resource. The third subframe includes the first time domain resource and another time domain resource. Optionally, a GP may exist between the first subframe and the second subframe.

The first time domain resource of the first subframe is used by the base station to send downlink control information to UE, where the downlink control information may carry UL grant information used to indicate an uplink resource. The second time domain resource of the first subframe is used by UE to send uplink data to the base station based on an uplink resource indicated by downlink control information. The third time domain resource of the first subframe is used by UE to send an uplink resource request message to the base station. The fourth time domain resource of the first subframe is used by UE to send uplink control information to the base station, such as CSI or information for feeding back a reception status of downlink data, and a time period corresponding to the fourth time domain resource of the first subframe may be used by the base station to allocate an uplink resource to UE based on an uplink resource request message. It should be noted that, herein, the UEs related to the first subframe may be same UE or different UEs.

The first time domain resource of the second subframe is used by the base station to send downlink control information to UE, where the downlink control information carries UL grant information used to indicate an uplink resource. The second time domain resource of the second subframe is used by UE to send uplink data to the base station by using an uplink resource indicated by downlink control information. The third time domain resource of the second subframe is used by UE to send uplink control information to the base station, such as CSI or information for feeding back a reception status of downlink data. Optionally, a time domain resource used by another UE to send an uplink resource request message may further exist between the second time domain resource and the third time domain resource of the second subframe.

The first time domain resource of the third subframe is used by the base station to send a reception status of uplink data of UE to the UE. If the base station sends a NACK, the base station may continue to send a UL grant to the UE, to schedule the UE to re-send the uplink data. The another time domain resource of the third subframe may have a same function as the second time domain resource of the first subframe or the second subframe, and may be used to transmit other information. Details are not described in the present invention again.

In the communication method shown in FIG. 5, another schematic flowchart of interaction among the base station, the first UE, and the second UE is shown in FIG. 8.

S82. The base station sends the first downlink control information to the first UE on the first time domain resource of the first subframe. The first downlink control information carries indication information used to indicate the uplink resource to be used by the first UE to send the uplink data to the base station.

S804. The second UE sends the uplink resource request message to the base station on the third time domain resource of the first subframe.

S806. The first UE sends, on the second time domain resource of the first subframe, the uplink data to the base station by using the uplink resource indicated by the first downlink control information.

S808. The base station allocates the uplink resource to the second UE based on the uplink resource request message of the second UE within the time period corresponding to the time domain resource after the third time domain resource of the first subframe, for example, allocates the uplink resource to the second UE within the time period corresponding to the second time domain resource.

S810. The base station sends the second downlink control information to the second UE on the first time domain resource of the second subframe, where the second downlink control information carries the indication information used to indicate the uplink resource.

S812. The second UE sends, on the second time domain resource of the second subframe, the uplink data to the base station by using the uplink resource indicated by the second downlink control information.

S814. The base station sends the third downlink control information to the second UE on the first time domain resource of the third subframe, where the third downlink control information carries the second reception status indication information used to indicate the reception status that is in the base station and that is of the uplink data sent by the second UE on the second time domain resource of the second subframe.

In the communication method shown in FIG. 8, the second UE sends the uplink resource request message to the base station on the third time domain before the fourth time domain resource of the first subframe, so that the base station has time to allocate the uplink resource to the second UE within the time period corresponding to the fourth time domain resource of the first subframe, and the uplink resource request message of the second UE is not affected by the uplink control information that may be sent by the another UE on the fourth time domain resource of the first subframe. In this way, the second UE and the base station can realize ultra-reliable ultra-low-latency communication.

A schematic structural diagram of the three subframes, namely, the first subframe, the second subframe, and the third subframe, corresponding to the communication method shown in FIG. 8 is shown in FIG. 9.

As shown in FIG. 9, the first subframe sequentially includes the first time domain resource, the second time domain resource, and the third time domain resource in chronological order, and a GP exists between the first time domain resource and the second time domain resource. The second subframe sequentially includes the first time domain resource and the second time domain resource, and a GP exists between the first time domain resource and the second time domain resource. The third subframe includes the first time domain resource and another time domain resource. Optionally, a GP may alternatively exist between the first subframe and the second subframe.

The first time domain resource of the first subframe is used by the base station to send downlink control information to UE, where the downlink control information may carry UL grant information used to indicate an uplink resource. The third time domain resource of the first subframe is used by UE to send an uplink resource request message to the base station. The second time domain resource of the first subframe is used by UE to send uplink data to the base station based on an uplink resource indicated by downlink control information, and a time period corresponding to the second time domain resource of the first subframe may be used by the base station to allocate an uplink resource to UE based on an uplink resource request message. It should be noted that, herein, the UEs related to the first subframe may be same UE or different UEs.

The first time domain resource of the second subframe is used by the base station to send downlink control information to UE, where the downlink control information carries UL grant information used to indicate an uplink resource. The second time domain resource of the second subframe is used by UE to send uplink data to the base station by using an uplink resource indicated by downlink control information.

The first time domain resource of the third subframe is used by the base station to send a reception status of uplink data of UE to the UE. The another time domain resource of the third subframe may have a same function as the second time domain resource of the first subframe or the second subframe, and may be used to transmit other information. Details are not described in the present invention again.

It should be understood that, in the communication methods in the embodiments of the present invention, different time domain resources of a same subframe may have same or different lengths, and first time domain resources, second time domain resources, or third time domain resources of the three subframes may have same or different lengths.

Optionally, in the several communication methods in the embodiments of the present invention, when the second UE (that is, URLLC UE) initially accesses a cell in which the base station is located, the second UE and the base station may pre-agree at least one of the following information, including a UE-specific sequence, a modulation and coding scheme (MCS) selection and a redundancy version, a size of a resource block required for transmission, a quantity of time-domain repetitions, power control, multi-antenna transmission settings, channel state information (CSI), a carrier identifier. Certainly, the information that is pre-agreed between the second UE and the base station may be not limited to the foregoing information.

The UE-specific sequence means that when the URLLC UE accesses the base station, the base station allocates a specific sequence to the URLLC UE to uniquely correspond to the URLLC UE. The specific sequence may be obtained based on a Zadoff-Chu (ZC) sequence generation manner, and correlation between specific sequences of various URLLC UEs is as small as possible to avoid mutual interference when a plurality of URLLC UEs transmit uplink resource requests.

Optionally, to distinguish a large quantity of URLLC UEs, the base station may divide, for the URLLC UEs, frequency domain locations for transmitting specific sequences. In this way, a specific sequence that can be transmitted at a frequency domain location uniquely corresponds to one URLLC UE.

The MCS and the redundancy version are selected by the URLLC UE based on a channel condition of the URLLC UE and a bit error rate requirement for URLLC when the URLLC UE accesses the base station.

The size of the resource block required for transmission is a size of a resource block required for a data amount of uplink data to be transmitted by the URLLC UE.

The quantity of time-domain repetitions means that to improve reliability of URLLC UE uplink transmission, performance of the URLLC UE uplink transmission may be improved by transmitting a same data packet for a plurality of times. During initial access, a quantity of time-domain repetitions of a URLLC UE uplink packet may be pre-agreed and pre-configured with the base station.

The power control means that to avoid excessively serious mutual interference among a plurality of URLLC UE uplink transmissions, the base station may notify in advance power used for the URLLC UE uplink transmissions.

The multi-antenna transmission settings mean that based on a capability of the URLLC UE, the URLLC UE may use a plurality of antennas to transmit an uplink request and uplink data, and the base station and the URLLC UE need to know a specific quantity of layers (layer) for multi-antenna transmission and precoding information.

The CSI is information such as quality of a channel on which the URLLC UE is located. Optionally, the base station may choose to schedule uplink transmission of the URLLC UE on a channel having a better URLLC UE channel response, or adjust the MCS selection and the quantity of time-domain repetitions based on the CSI.

Optionally, in a case of carrier aggregation, the base station and the URLLC UE need to know a location of a carrier frequency that can be used by the URLLC UE.

Optionally, the URLLC UE uplink data may be transmitted in a frequency hopping manner. In this case, the base station and the URLLC UE need to know a size of a frequency hopping resource.

After the base station and the URLLC UE predetermine at least one of the foregoing information, in a first subframe, the base station may send downlink control information and downlink data on a first time domain resource and a second time domain resource respectively. After a period of time, the URLLC UE sends an uplink resource request on a preserved third time domain resource, that is, transmits a specific sequence corresponding to the URLLC UE on a frequency domain subcarrier on which the time domain resource is located.

The URLLC UE transmits, only on the third time domain resource, the specific sequence used as a UE identifier. Therefore, resources used for transmission can be greatly reduced. In this way, the third time domain resource can support a large quantity of URLLC UEs in sending uplink resource request messages.

The base station is used as a receive end to perform Fourier transformation on a received signal, to obtain a signal transmitted on each frequency domain subcarrier. Then, correlation calculation may be performed on the signal received on the frequency domain subcarrier and a locally stored specific sequence of the URLLC UE. If a correlation calculation result exceeds a preset threshold, it is determined that the UE corresponding to the specific sequence in the frequency domain has a URLLC uplink transmission request. Optionally, the preset threshold may be correspondingly adjusted based on a channel. Because a specific sequence of each URLLC UE is unique, mutual interference can be avoided, thereby further improving reliability.

The base station allocates, based on a previously agreed size of a resource block required for transmission, a resource used for URLLC UE uplink transmission. In a first time domain resource of a second subframe, information about the resource is carried in a UL grant.

Optionally, an identifier, for example, a cell radio network temporary identifier (Cell Radio Network Temporary Identifier, C-RNTI), of URLLC UE to which a resource is allocated may be carried in a UL grant for transmission, or may be used as a scrambling sequence to scramble UL grant information or a UL grant signal. In this way, only the URLLC UE corresponding to the C-RNTI can descramble the UL grant and obtain scheduling information included in the UL grant through decoding.

When the URLLC UE decodes the UL grant to obtain information about the allocated resource, the URLLC UE may perform URLLC uplink data transmission on an allocated second time domain resource based on previously agreed configuration information such as a quantity of time-domain repetitions, a frequency hopping manner, or a multi-antenna transmission manner.

Because the URLLC UE and the base station have specified information such as a used resource and MCS when the URLLC UE transmits the uplink resource request, the URLLC UE may prepare a URLLC uplink data packet in advance, thereby reducing a latency caused by preparing data by the UE, that is, reducing a latency. In addition, when transmitting the uplink data, the URLLC UE may use the preset quantity of time-domain repetitions or frequency-domain frequency hopping manner, to improve transmission reliability. Moreover, the base station may start decoding in advance based on division of the uplink data of the URLLC UE in terms of time-domain repetitions, to reduce a latency caused by decoding.

In a third subframe, the base station returns an ACK or a NACK in a downlink control part of a first time domain resource. When returning a NACK, the base station may schedule the URLLC UE to re-transmit the uplink data.

Optionally, when the URLLC UE accesses the base station, the base station may allocate an orthogonal sequence to the URLLC UE. In this way, when sending an uplink resource request message, the URLLC UE may use the orthogonal sequence to perform spectrum spreading on the to-be-sent information. Optionally, to distinguish a large quantity of URLLC UEs, the base station may divide, for the URLLC UEs, frequency domain locations for sending uplink resource request messages, so as to prevent the large quantity of URLLC UEs from sending the uplink resource request messages on a same frequency.

Optionally, in the uplink resource request sent by the URLLC UE, the C-RNTI of the URLLC UE may be carried as an identifier of the URLLC UE.

Optionally, when the base station and the second UE pre-agree or do not pre-agree the foregoing configuration information, an uplink resource request message sent by the URLLC UE may include, but is not limited to, one or more of the following several types of configuration information, including a C-RNTI, a size of a resource block required for transmission, MCS and a redundancy version, a quantity of time-domain repetitions, a frequency domain frequency hopping indication, a demodulation reference signal (Demodulation Reference Signal, DMRS), and the like. The DMRS is used to measure a channel response, and is further used to perform decoding.

When the URLLC UE sends the uplink resource request message on the preserved third time domain resource of the first subframe, if the uplink resource request message carries the configuration information, the URLLC UE may send the uplink data based on different service data by using different information such as MCSs and sizes of resource blocks. The URLLC UE more flexibly sends the uplink data compared with a case in which the URLLC UE sends the uplink data based on the agreed configuration information.

Optionally, the URLLC UE may further add CSI to the uplink resource request message, so that the base station can allocate, based on the CSI, an uplink resource to the URLLC UE for transmitting the uplink data.

The communication methods and the subframe structures in the embodiments of the present invention are described above with reference to FIG. 2 to FIG. 9. The base station, the UE, and the communications system in the embodiments of the present invention are described below with reference to FIG. 10 to FIG. 18.

FIG. 10 is a schematic structural diagram of a base station according to an embodiment of the present invention. It should be understood that, a base station 1000 shown in FIG. 10 is merely an example. The base station 1000 in this embodiment of the present invention may further include other modules or units, or may include modules having functions similar to those of modules in FIG. 10, or may not necessarily include all modules in FIG. 10.

A sending module 1010 is configured to send first downlink control information to first user equipment UE on a first time domain resource of a first subframe.

The sending module 1010 is further configured to send downlink data to the first UE on a second time domain resource of the first subframe.

A receiving module 1020 is configured to receive, on a third time domain resource of the first subframe, an uplink resource request message sent by second UE.

The first time domain resource of the first subframe is located before the second time domain resource of the first subframe, the second time domain resource of the first subframe is located before the third time domain resource of the first subframe, the first downlink control information includes first resource indication information, the first resource indication information is used to indicate a first downlink resource used by the base station to send the downlink data, and the uplink resource request message includes identification information of the second UE.

In this embodiment of the present invention, the base station not only may send downlink control information and downlink data to another UE in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

Optionally, in an embodiment, the receiving module is further configured to receive, on a fourth time domain resource of the first subframe, uplink control information sent by the first UE. The uplink control information includes first reception status indication information, and the first reception status indication information is used to indicate a reception status of the downlink data.

Optionally, in an embodiment, the third time domain resource of the first subframe is located before the fourth time domain resource of the first subframe.

Optionally, in an embodiment, the base station further includes a processing module. The processing module is configured to allocate a first uplink resource to the second UE based on the uplink resource request message within a time period corresponding to a time domain resource after the third time domain resource of the first subframe. The sending module is further configured to send second downlink control information to the second UE on a first time domain resource of a second subframe. The second downlink control information includes second resource indication information, and the second resource indication information is used to indicate the first uplink resource.

Optionally, in an embodiment, the receiving module is further configured to receive, on a second time domain resource of the second subframe, uplink data sent by the second UE by using the first uplink resource based on the second downlink control information.

Optionally, in an embodiment, the sending module is further configured to send third downlink control information to the second UE on a first time domain resource of a third subframe. The third downlink control information includes second reception status indication information, and the second reception status indication information is used to indicate a reception status of the uplink data.

Optionally, in an embodiment, the processing module is specifically configured to allocate, within the time period corresponding to the time domain resource after the third time domain resource of the first subframe, the first uplink resource to the second UE based on the uplink resource request message and first configuration information that is pre-agreed between the base station and the second UE. The receiving module is specifically configured to receive, on the second time domain resource of the second subframe and based on the first configuration information, the uplink data sent by the second UE by using the first uplink resource based on the first configuration information.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The processing module is specifically configured to allocate the first uplink resource to the second UE based on the second configuration information within the time period corresponding to the time domain resource after the third time domain resource of the first subframe. The receiving module is specifically configured to receive, on the second time domain resource of the second subframe and based on the second configuration information, the uplink data sent by the second UE by using the first uplink resource based on the second configuration information.

The second configuration information includes at least one of the following information, including a C-RNTI of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the above and other operations and/or functions of the units in the base station in this embodiment of the present invention shown in FIG. 10 are respectively used to implement the corresponding procedures of the communication method in FIG. 2, and are not further described herein for brevity.

FIG. 11 is a schematic structural diagram of a base station according to an embodiment of the present invention. It should be understood that, the base station 1100 shown in FIG. 11 is merely an example. The base station 1000 in this embodiment of the present invention may further include other modules or units, or may include modules having functions similar to those of modules in FIG. 11, or may not necessarily include all modules in FIG. 11.

A sending module 1110 is configured to send first downlink control information to first user equipment UE on a first time domain resource of a first subframe.

The sending module 1110 is further configured to receive, on a second time domain resource of the first subframe, first uplink data sent by the first UE based on the first downlink control information.

A receiving module 1120 is configured to receive, on a third time domain resource of the first subframe, an uplink resource request message sent by second UE.

The first time domain resource of the first subframe is located before the second time domain resource and the third time domain of the first subframe, the first downlink control information includes first resource indication information, the first resource indication information is used to indicate a first uplink resource to be used by the first UE to send the first uplink data, and the uplink resource request message includes identification information of the second UE.

In this embodiment of the present invention, the base station not only may send downlink control information to another UE and receive uplink data in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

Optionally, in an embodiment, the receiving module is further configured to receive uplink control information within a time period corresponding to a fourth time domain resource of the first subframe. The fourth time domain resource of the first subframe is located after the second time domain resource of the first subframe.

Optionally, in an embodiment, the third time domain resource of the first subframe is located before the fourth time domain resource of the first subframe.

Optionally, in an embodiment, the base station further includes a processing module. The processing module is configured to allocate a first uplink resource to the second UE based on the uplink resource request message within a time period corresponding to a time domain resource after the third time domain resource of the first subframe. The sending module is further configured to send second downlink control information to the second UE on a first time domain resource of a second subframe. The second downlink control information includes second resource indication information, and the second resource indication information is used to indicate the first uplink resource.

Optionally, in an embodiment, the receiving module is further configured to receive, on a second time domain resource of the second subframe, uplink data sent by the second UE by using the first uplink resource based on the second downlink control information.

Optionally, in an embodiment, the sending module is further configured to send third downlink control information to the second UE on a first time domain resource of a third subframe. The third downlink control information includes second reception status indication information, and the second reception status indication information is used to indicate a reception status of the uplink data.

Optionally, in an embodiment, the processing module is specifically configured to allocate, within the time period corresponding to the time domain resource after the third time domain resource of the first subframe, the first uplink resource to the second UE based on the uplink resource request message and first configuration information that is pre-agreed between the base station and the second UE. The receiving module is specifically configured to receive, on the second time domain resource of the second subframe and based on the first configuration information, the uplink data sent by the second UE by using the first uplink resource based on the first configuration information.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The processing module is specifically configured to allocate the first uplink resource to the second UE based on the second configuration information within the time period corresponding to the time domain resource after the third time domain resource of the first subframe. The receiving module is specifically configured to receive, on the second time domain resource of the second subframe and based on the second configuration information, the uplink data sent by the second UE by using the first uplink resource based on the second configuration information.

The second configuration information includes at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the above and other operations and/or functions of the units in the base station in this embodiment of the present invention shown in FIG. 11 are respectively used to implement the corresponding procedures of the communication method in FIG. 5, and are not further described herein for brevity.

Figure 12:
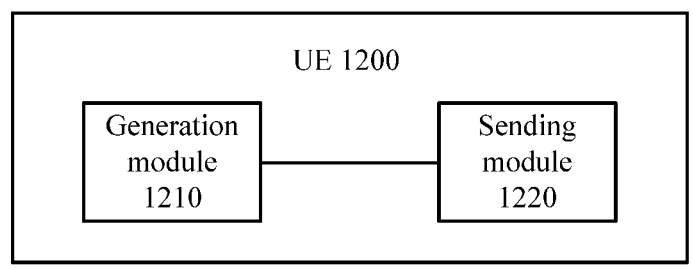
FIG. 12 is a schematic structural diagram of UE according to an embodiment of the present invention.

FIG. 12 is a schematic structural diagram of UE according to another embodiment of the present invention. It should be understood that, the UE 1200 shown in FIG. 12 is merely an example. The UE 1200 in this embodiment of the present invention may further include other modules or units, or may include modules having functions similar to those of modules in FIG. 12, or may not necessarily include all modules in FIG. 12.

A generation module 1210 is configured to generate an uplink resource request message.

A sending module 1220 is configured to send the uplink resource request message to a base station on a third time domain resource of a first subframe.

The first subframe includes a first time domain resource, a second time domain resource, and the third time domain resource, the first time domain resource of the first subframe is located before the second time domain resource of the first subframe, the second time domain resource of the first subframe is located before the third time domain resource of the first subframe, the first time domain resource of the first subframe is used by the base station to send first downlink control information, the second time domain resource of the first subframe is used by the base station to send downlink data, the first downlink control information includes first resource indication information, the first resource indication information is used to indicate a first downlink resource used by base station to send the downlink data to the first UE, and the uplink resource request message includes identification information of the second UE.

In this embodiment of the present invention, the UE may receive an uplink resource request message, sent by the UE, on a fixed third time domain resource of a first subframe in which downlink control information and downlink data can be sent. In this way, the base station can allocate an uplink resource to the UE based on the uplink resource request message, and then the UE can send uplink data to the base station based on the allocated uplink resource.

Optionally, in an embodiment, the first subframe further includes a fourth time domain resource. The fourth time domain resource of the first subframe is used by the base station to receive uplink control information. The uplink control information includes first reception status indication information, and the first reception status indication information is used to indicate a reception status of the downlink data.

Optionally, in an embodiment, the third time domain resource of the first subframe is located before the fourth time domain resource of the first subframe.

Optionally, in an embodiment, the UE further includes a receiving module. The receiving module is configured to receive second downlink control information sent by the base station on a first time domain resource of a second subframe. The second downlink control information includes second resource indication information, and the second resource indication information is used to indicate a first uplink resource. The first uplink resource is an uplink resource allocated by the base station to the UE based on the uplink resource request message within a time period corresponding to a time domain resource after the third time domain resource of the first subframe.

Optionally, in an embodiment, the sending module is further configured to send uplink data to the base station on a second time domain resource of the second subframe by using the first uplink resource based on the second downlink control information.

Optionally, in an embodiment, the receiving module is further configured to receive, on a first time domain resource of a third subframe, third downlink control information sent by the base station. The third downlink control information includes second reception status indication information, and the second reception status indication information is used to indicate a reception status of the uplink data.

Optionally, in an embodiment, the sending module is specifically configured to send the uplink data to the base station on the second time domain resource of the second subframe by using the first uplink resource based on first configuration information that is pre-agreed between the UE and the base station.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The sending module is specifically configured to send the uplink data to the base station on the second time domain resource of the second subframe by using the first uplink resource based on the second configuration information.

The second configuration information includes at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the above and other operations and/or functions of the units in the UE in this embodiment of the present invention shown in FIG. 12 correspond to the corresponding procedures of the UE in the communication method in FIG. 2, and are not further described herein for brevity.

Figure 13:
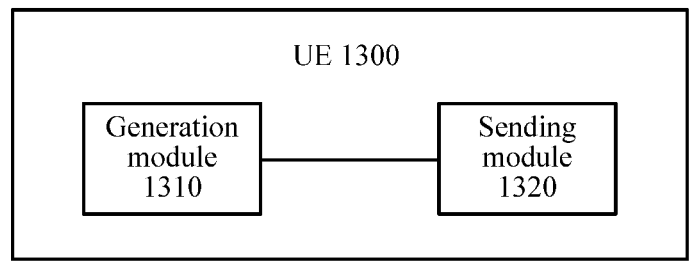
FIG. 13 is a schematic structural diagram of UE according to another embodiment of the present invention.

FIG. 13 is a schematic structural diagram of UE according to another embodiment of the present invention. It should be understood that, the UE 1300 shown in FIG. 13 is merely an example. The UE 1300 in this embodiment of the present invention may further include other modules or units, or may include modules having functions similar to those of modules in FIG. 13, or may not necessarily include all modules in FIG. 13.

A generation module 1310 is configured to generate an uplink resource request message.

A sending module 1320 is configured to send the uplink resource request message to a base station on a third time domain resource of a first subframe.

The first subframe includes a first time domain resource, a second time domain resource, and the third time domain resource, the first time domain resource of the first subframe is located before the second time domain resource and the third time domain of the first subframe, the first time domain resource of the first subframe is used by the base station to send first downlink control information, the second time domain resource of the first subframe is used by another UE to send first uplink data, the first downlink control information includes first resource indication information, the first resource indication information is used to indicate a first uplink resource to be used by the another UE to send the first uplink data, and the uplink resource request message includes identification information of the UE.

In this embodiment of the present invention, the UE may receive an uplink resource request message, sent by the UE, on a fixed third time domain resource of a first subframe in which downlink control information and uplink data can be sent. In this way, the base station can allocate an uplink resource to the UE based on the uplink resource request message, and then the UE can send uplink data to the base station based on the allocated uplink resource.

Optionally, in an embodiment, the first subframe further includes a fourth time domain resource. The fourth time domain resource of the first subframe is located after the second time domain resource of the first subframe, and the fourth time domain resource of the first subframe is used by the base station to receive uplink control information.

Optionally, in an embodiment, the third time domain resource of the first subframe is located before the fourth time domain resource of the first subframe.

Optionally, in an embodiment, the UE further includes a receiving module. The receiving module is configured to receive second downlink control information sent by the base station on a first time domain resource of a second subframe.

The second downlink control information includes second resource indication information, and the second resource indication information is used to indicate a first uplink resource. The first uplink resource is an uplink resource allocated by the base station to the UE based on the uplink resource request message within a time period corresponding to a time domain resource after the third time domain resource of the first subframe.

Optionally, in an embodiment, the sending module is further configured to send uplink data to the base station on a second time domain resource of the second subframe by using the first uplink resource based on the second downlink control information.

Optionally, in an embodiment, the receiving module is further configured to receive, on a first time domain resource of a third subframe, third downlink control information sent by the base station. The third downlink control information includes second reception status indication information, and the second reception status indication information is used to indicate a reception status of the uplink data.

Optionally, in an embodiment, the sending module is specifically configured to send the uplink data to the base station on the second time domain resource of the second subframe by using the first uplink resource based on first configuration information that is pre-agreed between the UE and the base station.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The sending module is specifically configured to send the uplink data to the base station on the second time domain resource of the second subframe by using the first uplink resource based on the second configuration information.

The second configuration information includes at least one of the following information, including a cell radio network temporary identifier C-RNTI of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the above and other operations and/or functions of the units in the UE in this embodiment of the present invention shown in FIG. 13 respectively correspond to the corresponding procedures of the UE in the communication method in FIG. 5, and are not further described herein for brevity.

Figure 14:
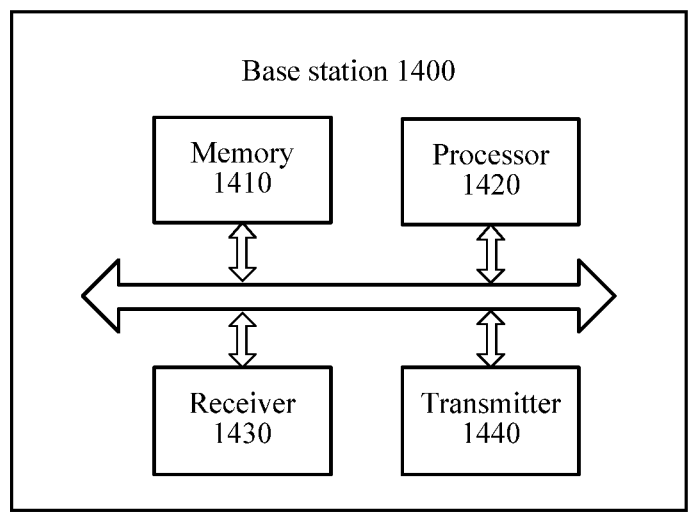
FIG. 14 is a schematic structural diagram of a base station according to another embodiment of the present invention.

FIG. 14 is a schematic structural diagram of a base station 1400 according to an embodiment of the present invention. The base station 1400 includes a memory 1410, a processor 1420, a receiver 1430, and a transmitter 1440.

The memory 1410 is configured to store a program.

The processor 1420 is configured to execute the program stored in the memory 1410. When executing the program stored in the memory 1410, the processor 1420 invokes the transmitter 1440 to send first downlink control information to first user equipment UE on a first time domain resource of a first subframe.

The transmitter 1440 is further configured to send downlink data to the first UE on a second time domain resource of the first subframe.

The receiver 1430 is configured to receive, on a third time domain resource of the first subframe, an uplink resource request message sent by second UE.

The first time domain resource of the first subframe is located before the second time domain resource of the first subframe, the second time domain resource of the first subframe is located before the third time domain resource of the first subframe, the first downlink control information includes first resource indication information, the first resource indication information is used to indicate a first downlink resource used by the base station to send the downlink data, and the uplink resource request message includes identification information of the second UE.

In this embodiment of the present invention, the base station not only may send downlink control information and downlink data to another UE in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

Optionally, in an embodiment, the receiver is further configured to receive, on a fourth time domain resource of the first subframe, uplink control information sent by the first UE. The uplink control information includes first reception status indication information, and the first reception status indication information is used to indicate a reception status of the downlink data.

Optionally, in an embodiment, the third time domain resource of the first subframe is located before the fourth time domain resource of the first subframe.

Optionally, in an embodiment, the processor is further configured to allocate a first uplink resource to the second UE based on the uplink resource request message within a time period corresponding to a time domain resource after the third time domain resource of the first subframe. The transmitter is further configured to send second downlink control information to the second UE on a first time domain resource of a second subframe. The second downlink control information includes second resource indication information, and the second resource indication information is used to indicate the first uplink resource.

Optionally, in an embodiment, the receiver is further configured to receive, on a second time domain resource of the second subframe, uplink data sent by the second UE by using the first uplink resource based on the second downlink control information.

Optionally, in an embodiment, the transmitter is further configured to send third downlink control information to the second UE on a first time domain resource of a third subframe. The third downlink control information includes second reception status indication information, and the second reception status indication information is used to indicate a reception status of the uplink data.

Optionally, in an embodiment, the processor is specifically configured to allocate, within the time period corresponding to the time domain resource after the third time domain resource of the first subframe, the first uplink resource to the second UE based on the uplink resource request message and first configuration information that is pre-agreed between the base station and the second UE. The receiver is specifically configured to receive, on the second time domain resource of the second subframe and based on the first configuration information, the uplink data sent by the second UE by using the first uplink resource based on the first configuration information.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The processor is specifically configured to allocate the first uplink resource to the second UE based on the second configuration information within the time period corresponding to the time domain resource after the third time domain resource of the first subframe. The receiver is specifically configured to receive, on the second time domain resource of the second subframe and based on the second configuration information, the uplink data sent by the second UE by using the first uplink resource based on the second configuration information.

The second configuration information includes at least one of the following information, including a C-RNTI of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the base station in this embodiment of the present invention shown in FIG. 14 may correspond to the base station shown in FIG. 10, and the above and other operations and/or functions of the units in the base station in this embodiment of the present invention shown in FIG. 14 are respectively used to implement the corresponding procedures of the communication method in FIG. 2, and are not further described herein for brevity.

Figure 15:
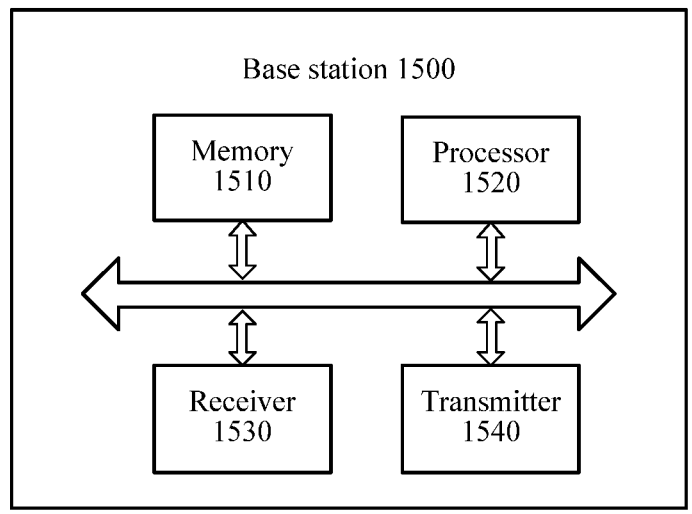
FIG. 15 is a schematic structural diagram of a base station according to another embodiment of the present invention.

FIG. 15 is a schematic structural diagram of a base station 1500 according to an embodiment of the present invention. The base station 1500 includes a memory 1510, a processor 1520, a receiver 1530, and a transmitter 1540.

The memory 1510 is configured to store a program.

The processor 1520 is configured to execute the program stored in the memory 1510. When executing the program stored in the memory 1510, the processor 1520 invokes the transmitter 1540 to send first downlink control information to first user equipment UE on a first time domain resource of a first subframe.

The transmitter 1540 is further configured to receive, on a second time domain resource of the first subframe, first uplink data sent by the first UE based on the first downlink control information.

The receiver 1530 is configured to receive, on a third time domain resource of the first subframe, an uplink resource request message sent by second UE.

The first time domain resource of the first subframe is located before the second time domain resource and the third time domain of the first subframe, the first downlink control information includes first resource indication information, the first resource indication information is used to indicate a first uplink resource to be used by the first UE to send the first uplink data, and the uplink resource request message includes identification information of the second UE.

In this embodiment of the present invention, the base station not only may send downlink control information to another UE and receive uplink data in a first subframe, but also may receive, on a fixed third time domain resource of the first subframe, an uplink resource request message sent by UE. In this way, the base station can allocate an uplink resource to the UE based on the uplink resource request message, and then the UE can send uplink data to the base station based on the allocated uplink resource.

Optionally, in an embodiment, the receiver is further configured to receive uplink control information within a time period corresponding to a fourth time domain resource of the first subframe. The fourth time domain resource of the first subframe is located after the second time domain resource of the first subframe.

Optionally, in an embodiment, the third time domain resource of the first subframe is located before the fourth time domain resource of the first subframe.

Optionally, in an embodiment, the processor is further configured to allocate a first uplink resource to the second UE based on the uplink resource request message within a time period corresponding to a time domain resource after the third time domain resource of the first subframe. The transmitter is further configured to send second downlink control information to the second UE on a first time domain resource of a second subframe. The second downlink control information includes second resource indication information, and the second resource indication information is used to indicate the first uplink resource.

Optionally, in an embodiment, the receiver is further configured to receive, on a second time domain resource of the second subframe, uplink data sent by the second UE by using the first uplink resource based on the second downlink control information.

Optionally, in an embodiment, the transmitter is further configured to send third downlink control information to the second UE on a first time domain resource of a third subframe. The third downlink control information includes second reception status indication information, and the second reception status indication information is used to indicate a reception status of the uplink data.

Optionally, in an embodiment, the processor is specifically configured to allocate, within the time period corresponding to the time domain resource after the third time domain resource of the first subframe, the first uplink resource to the second UE based on the uplink resource request message and first configuration information that is pre-agreed between the base station and the second UE. The receiver is specifically configured to receive, on the second time domain resource of the second subframe and based on the first configuration information, the uplink data sent by the second UE by using the first uplink resource based on the first configuration information.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The processor is specifically configured to allocate the first uplink resource to the second UE based on the second configuration information within the time period corresponding to the time domain resource after the third time domain resource of the first subframe. The receiver is specifically configured to receive, on the second time domain resource of the second subframe and based on the second configuration information, the uplink data sent by the second UE by using the first uplink resource based on the second configuration information.

The second configuration information includes at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the base station in this embodiment of the present invention shown in FIG. 15 may correspond to the base station shown in FIG. 11, and the above and other operations and/or functions of the units in the base station in this embodiment of the present invention shown in FIG. 15 are respectively used to implement the corresponding communication procedures of the communication method in FIG. 5, and are not further described herein for brevity.

Figure 16:
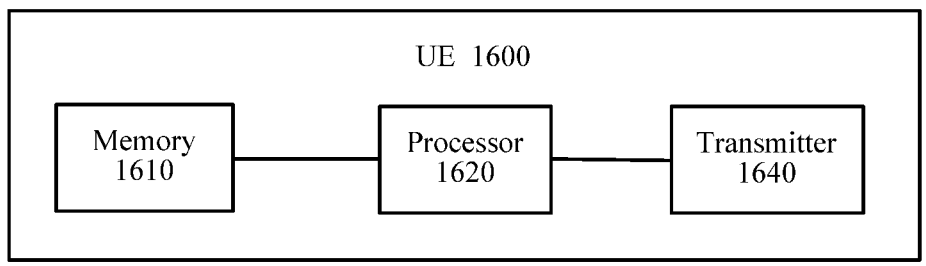
FIG. 16 is a schematic structural diagram of UE according to another embodiment of the present invention.

FIG. 16 is a schematic structural diagram of UE 1600 according to an embodiment of the present invention. The UE 1600 includes a memory 1610, a processor 1620, and a transmitter 1640.

The memory 1610 is configured to store a program.

The processor 1620 is configured to execute the program stored in the memory 1610. When executing the program stored in the memory 1610, the processor 1620 is specifically configured to generate an uplink resource request message.

The transmitter 1640 is configured to send the uplink resource request message to a base station on a third time domain resource of a first subframe.

The first subframe includes a first time domain resource, a second time domain resource, and the third time domain resource, the first time domain resource of the first subframe is located before the second time domain resource of the first subframe, the second time domain resource of the first subframe is located before the third time domain resource of the first subframe, the first time domain resource of the first subframe is used by the base station to send first downlink control information, the second time domain resource of the first subframe is used by the base station to send downlink data, the first downlink control information includes first resource indication information, the first resource indication information is used to indicate a first downlink resource used by base station to send the downlink data to the first UE, and the uplink resource request message includes identification information of the second UE.

In this embodiment of the present invention, the UE may receive an uplink resource request message, sent by the UE, on a fixed third time domain resource of a first subframe in which downlink control information and downlink data can be sent. In this way, the base station can allocate an uplink resource to the UE based on the uplink resource request message, and then the UE can send uplink data to the base station based on the allocated uplink resource.

Optionally, in an embodiment, the first subframe further includes a fourth time domain resource. The fourth time domain resource of the first subframe is used by the base station to receive uplink control information. The uplink control information includes first reception status indication information, and the first reception status indication information is used to indicate a reception status of the downlink data.

Optionally, in an embodiment, the third time domain resource of the first subframe is located before the fourth time domain resource of the first subframe.

Optionally, in an embodiment, the UE further includes a receiver. The receiver is configured to receive second downlink control information sent by the base station on a first time domain resource of a second subframe. The second downlink control information includes second resource indication information, and the second resource indication information is used to indicate a first uplink resource. The first uplink resource is an uplink resource allocated by the base station to the UE based on the uplink resource request message within a time period corresponding to a time domain resource after the third time domain resource of the first subframe.

Optionally, in an embodiment, the transmitter is further configured to send uplink data to the base station on a second time domain resource of the second subframe by using the first uplink resource based on the second downlink control information.

Optionally, in an embodiment, the receiver is further configured to receive, on a first time domain resource of a third subframe, third downlink control information sent by the base station. The third downlink control information includes second reception status indication information, and the second reception status indication information is used to indicate a reception status of the uplink data.

Optionally, in an embodiment, the transmitter is specifically configured to send the uplink data to the base station on the second time domain resource of the second subframe by using the first uplink resource based on first configuration information that is pre-agreed between the UE and the base station.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The transmitter is specifically configured to send the uplink data to the base station on the second time domain resource of the second subframe by using the first uplink resource based on the second configuration information.

The second configuration information includes at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the UE in this embodiment of the present invention shown in FIG. 16 may correspond to the UE shown in FIG. 12, and the above and other operations and/or functions of the units in the UE in this embodiment of the present invention shown in FIG. 16 are respectively used to implement the corresponding procedures of the communication method in FIG. 2, and are not further described herein for brevity.

Figure 17:
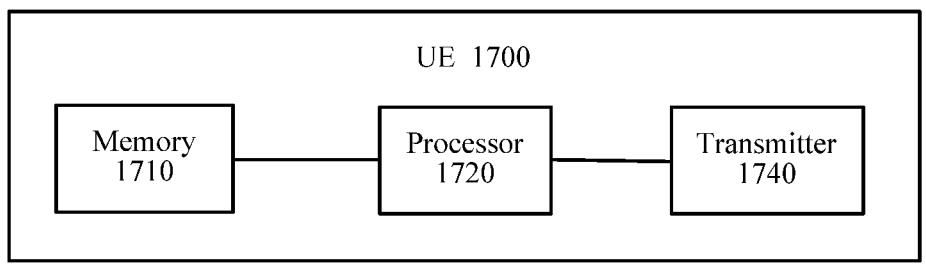
FIG. 17 is a schematic structural diagram of UE according to another embodiment of the present invention.

FIG. 17 is a schematic structural diagram of UE 1700 according to an embodiment of the present invention. The UE 1700 includes a memory 1710, a processor 1720, and a transmitter 1740.

The memory 1710 is configured to store a program.

The processor 1720 is configured to execute the program stored in the memory 1710. When executing the program stored in the memory 1710, the processor 1720 is specifically configured to generate an uplink resource request message.

The transmitter 1740 is configured to send the uplink resource request message to a base station on a third time domain resource of a first subframe.

The first subframe includes a first time domain resource, a second time domain resource, and the third time domain resource, the first time domain resource of the first subframe is located before the second time domain resource and the third time domain of the first subframe, the first time domain resource of the first subframe is used by the base station to send first downlink control information, the second time domain resource of the first subframe is used by another UE to send first uplink data, the first downlink control information includes first resource indication information, the first resource indication information is used to indicate a first uplink resource to be used by the another UE to send the first uplink data, and the uplink resource request message includes identification information of the UE.

In this embodiment of the present invention, the UE may receive an uplink resource request message, sent by the UE, on a fixed third time domain resource of a first subframe in which downlink control information and uplink data can be sent. In this way, the base station can allocate an uplink resource to the UE based on the uplink resource request message, and then the UE can send uplink data to the base station based on the allocated uplink resource.

Optionally, in an embodiment, the first subframe further includes a fourth time domain resource. The fourth time domain resource of the first subframe is located after the second time domain resource of the first subframe, and the fourth time domain resource of the first subframe is used by the base station to receive uplink control information.

Optionally, in an embodiment, the third time domain resource of the first subframe is located before the fourth time domain resource of the first subframe.

Optionally, in an embodiment, the UE further includes a receiver. The receiver is configured to receive second downlink control information sent by the base station on a first time domain resource of a second subframe.

The second downlink control information includes second resource indication information, and the second resource indication information is used to indicate a first uplink resource. The first uplink resource is an uplink resource allocated by the base station to the UE based on the uplink resource request message within a time period corresponding to a time domain resource after the third time domain resource of the first subframe.

Optionally, in an embodiment, the transmitter is further configured to send uplink data to the base station on a second time domain resource of the second subframe by using the first uplink resource based on the second downlink control information.

Optionally, in an embodiment, the receiver is further configured to receive, on a first time domain resource of a third subframe, third downlink control information sent by the base station. The third downlink control information includes second reception status indication information, and the second reception status indication information is used to indicate a reception status of the uplink data.

Optionally, in an embodiment, the transmitter is specifically configured to send the uplink data to the base station on the second time domain resource of the second subframe by using the first uplink resource based on first configuration information that is pre-agreed between the UE and the base station.

The first configuration information includes at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

Optionally, in an embodiment, the uplink resource request message further includes second configuration information. The transmitter is specifically configured to send the uplink data to the base station on the second time domain resource of the second subframe by using the first uplink resource based on the second configuration information.

The second configuration information includes at least one of the following information, including a cell radio network temporary identifier C-RNTI of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

It should be understood that, the UE in this embodiment of the present invention shown in FIG. 17 may correspond to the UE shown in FIG. 13, and the above and other operations and/or functions of the units in the UE in this embodiment of the present invention shown in FIG. 17 are respectively used to implement the corresponding procedures of the communication method in FIG. 5, and are not further described herein for brevity.

Figure 18:
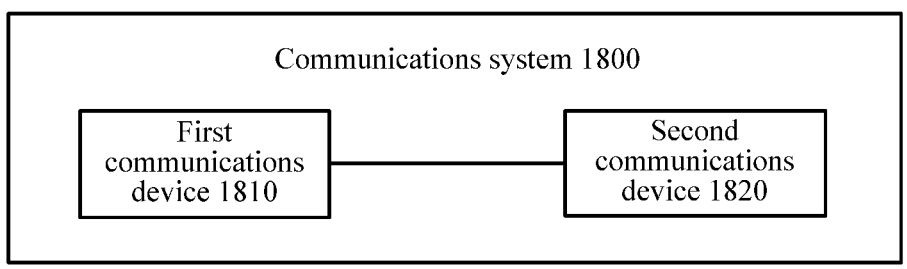
FIG. 18 is a schematic structural diagram of communication according to another embodiment of the present invention.

FIG. 18 is a schematic architectural diagram of a communications system according to an embodiment of the present invention. The communications system 1800 includes a first communications device 1810 and a second communications device 1820.

It should be understood that, the communications system 1800 shown in FIG. 18 is merely an example. The communications system in this embodiment of the present invention may further include other modules or units, or may include modules having functions similar to those of modules in FIG. 18, or may not necessarily include all modules in FIG. 18.

The first communications device 1810 may be the base station shown in FIG. 10, FIG. 11, FIG. 14, or FIG. 15, and the second communications device 1820 may be the UE shown in FIG. 12, FIG. 13, FIG. 16, or FIG. 17.

Specifically, when the first communications device 1810 is the base station 1000 shown in FIG. 10, the second communications device 1820 may be the UE 1200 shown in FIG. 12. When the first communications device 1810 is the base station 1100 shown in FIG. 11, the second communications device 1820 may be the UE 1300 shown in FIG. 13. When the first communications device 1810 is the base station 1400 shown in FIG. 14, the second communications device 1820 may be the UE 1600 shown in FIG. 16. When the first communications device 1810 is the base station 1500 shown in FIG. 15, the second communications device 1820 may be the UE 1700 shown in FIG. 17.

For the base station shown in FIG. 10, FIG. 11, FIG. 14, or FIG. 15 and the UE shown in FIG. 12, FIG. 13, FIG. 16, or FIG. 17, refer to the foregoing content. For brevity, details are not described herein.

It may be understood that the processor in the embodiments of the present invention may be an integrated circuit chip, and has a signal processing capability. In an implementation process, steps in the foregoing method embodiments can be implemented by using a hardware integrated logical circuit in the processor, or by using instructions in a form of software. The processor may further be a general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a discrete gate or transistor logic device, or a discrete hardware component. All methods, steps, and logical block diagrams disclosed in the embodiments of the present invention may be implemented or performed. The general-purpose processor may be a microprocessor or the processor may be any conventional processor, or the like. Steps of the methods disclosed in the embodiments of the present invention may be directly performed and completed by a hardware decoding processor, or may be performed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method described in this specification aims to include but is not limited to these memories and any memory of another proper type.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only, that is, B may also be determined according to A and/or other information.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    generating, by a first user equipment (UE), an uplink resource request message; and
    sending, by the first UE, the uplink resource request message to a base station on a third time domain resource of a first subframe;
    wherein the first subframe comprises a first time domain resource, a second time domain resource, and the third time domain resource, wherein the first time domain resource of the first subframe is located before the second time domain resource of the first subframe, wherein the second time domain resource of the first subframe is located before the third time domain resource of the first subframe, the first time domain resource of the first subframe is used by the base station to send first downlink control information, wherein the second time domain resource of the first subframe is used by the base station to send downlink data, wherein the first downlink control information comprises first resource indication information, wherein the first resource indication information indicates a first downlink resource used by base station to send the downlink data to a second UE, and wherein the uplink resource request message comprises identification information of the first UE.

2. The communication method according to claim 1, wherein the first subframe further comprises a fourth time domain resource; and wherein the fourth time domain resource of the first subframe is used by the base station to receive uplink control information, wherein the uplink control information comprises first reception status indication information, and the first reception status indication information indicates a reception status of the downlink data.

3. The communication method according to claim 2, wherein the third time domain resource of the first subframe is located before the fourth time domain resource of the first subframe.

4. The communication method according to claim 3, wherein the communication method further comprises:

receiving, by the first UE, second downlink control information sent by the base station on a first time domain resource of a second subframe, wherein the second downlink control information comprises second resource indication information, and the second resource indication information indicates a first uplink resource, wherein the first uplink resource is an uplink resource allocated by the base station to the first UE according to the uplink resource request message within a time period corresponding to a time domain resource after the third time domain resource of the first subframe.

5. The communication method according to claim 4, wherein the communication method further comprises:

sending, by the first UE, uplink data to the base station on a second time domain resource of the second subframe by using the first uplink resource according to the second downlink control information.

6. The communication method according to claim 5, wherein the communication method further comprises:

receiving, by the first UE on a first time domain resource of a third subframe, third downlink control information sent by the base station, wherein the third downlink control information comprises second reception status indication information, and the second reception status indication information indicates a reception status of the uplink data.

7. The communication method according to claim 5, wherein the uplink resource request message further comprises second configuration information; and wherein the sending, by the first UE, uplink data to the base station on a second time domain resource of the second subframe by using the first uplink resource according to the second downlink control information comprises:

sending, by the first UE, the uplink data to the base station on the second time domain resource of the second subframe by using the first uplink resource according to the second configuration information;

wherein the second configuration information comprises at least one a cell radio network temporary identifier (C-RNTI) of the second UE, modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

8. The communication method according to claim 4, wherein the sending, by the first UE, uplink data to the base station on a second time domain resource of the second subframe by using the first uplink resource according to the second downlink control information comprises:

sending, by the first UE, the uplink data to the base station on the second time domain resource of the second subframe by using the first uplink resource according to first configuration information that is pre-agreed between the first UE and the base station, wherein the first configuration information comprises at least one of the following information, including modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

9. A user equipment (UE), comprising:

a processor; and a non-transitory computer-readable storage medium storing a program to be executed by the processor, the program including instructions to:

generate an uplink resource request message; and send the uplink resource request message to a base station on a third time domain resource of a first subframe;

wherein the first subframe comprises a first time domain resource, a second time domain resource, and the third time domain resource, the first time domain resource of the first subframe is located before the second time domain resource of the first subframe, the second time domain resource of the first subframe is located before the third time domain resource of the first subframe, the first time domain resource of the first subframe is used by the base station to send first downlink control information, the second time domain resource of the first subframe is used by the base station to send downlink data, the first downlink control information comprises first resource indication information, the first resource indication information indicates a first downlink resource used by base station to send the downlink data to a second UE, and the uplink resource request message comprises identification information of the UE.

10. The UE according to claim 9, wherein the first subframe further comprises a fourth time domain resource; and wherein the fourth time domain resource of the first subframe is used by the base station to receive uplink control information, wherein the uplink control information comprises first reception status indication information, and wherein the first reception status indication information indicates a reception status of the downlink data.

11. The UE according to claim 10, wherein the third time domain resource of the first subframe is located before the fourth time domain resource of the first subframe.

12. The UE according to claim 11, wherein the program further includes instructions to receive second downlink control information sent by the base station on a first time domain resource of a second subframe; and wherein the second downlink control information comprises second resource indication information, and the second resource indication information indicates a first uplink resource, wherein the first uplink resource is an uplink resource allocated by the base station to the UE according to the uplink resource request message within a time period corresponding to a time domain resource after the third time domain resource of the first subframe.

13. The UE according to claim 12, wherein the program further includes instructions to send uplink data to the base station on a second time domain resource of the second subframe by using the first uplink resource according to the second downlink control information.

14. The UE according to claim 13, wherein the program further includes instructions to receive, on a first time domain resource of a third subframe, third downlink control information sent by the base station; and wherein the third downlink control information comprises second reception status indication information, and the second reception status indication information indicates a reception status of the uplink data.

15. The UE according to claim 13, wherein the program further includes instructions to send the uplink data to the base station on the second time domain resource of the second subframe by using the first uplink resource according to first configuration information that is pre-agreed between the UE and the base station; and wherein the first configuration information comprises at least one of modulation and coding scheme (MCS) information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

16. The UE according to claim 13, wherein the uplink resource request message further comprises second configuration information;

wherein the program further includes instructions to send the uplink data to the base station on the second time domain resource of the second subframe by using the first uplink resource according to the second configuration information; and wherein the second configuration information comprises at least one of the following information, including a cell radio network temporary identifier C-RNTI of the second UE, MCS information of the uplink data, size information of each resource block required for transmitting the uplink data, frequency hopping resource information of the uplink data, information about a quantity of time-domain repetitions of one data packet in the uplink data, power information used by the second UE to send the uplink data, a quantity of layers of a plurality of antennas and precoding information that are used by the second UE to send the uplink data, quality information of a channel used by the second UE to send the uplink data, or carrier identification information used by the second UE to send the uplink data.

17. A communications system, comprising:

a first user equipment (UE), configured to generate an uplink resource request message; and a base station, the base station configured to:

send first downlink control information to a second UE on a first time domain resource of a first subframe, send downlink data to the second UE on a second time domain resource of the first subframe; and receive, on a third time domain resource of the first subframe, the uplink resource request message sent by the first UE on a third time domain resource of the first subframe;

wherein the first subframe comprises the first time domain resource, the second time domain resource, and the third time domain resource, wherein the second time domain resource of the first subframe is located before the third time domain resource of the first subframe, wherein the first time domain resource of the first subframe is used by the base station to send the first downlink control information, wherein the second time domain resource of the first subframe is used by the base station to send the downlink data, wherein the first downlink control information comprises first resource indication information, wherein the first resource indication information indicates a first downlink resource used by base station to send the downlink data to the second UE, and the uplink resource request message comprises identification information of the first UE.

18. The system according to claim 17, wherein the base station is further configured to receive, on a fourth time domain resource of the first subframe, uplink control information sent by the second UE;

wherein the uplink control information comprises first reception status indication information, and the first reception status indication information indicates a reception status of the downlink data; and wherein the third time domain resource of the first subframe is located before the fourth time domain resource of the first subframe.

19. The system according to claim 17, wherein the base station is further configured to allocate a first uplink resource to the first UE according to the uplink resource request message within a time period corresponding to a time domain resource after the third time domain resource of the first subframe;

send second downlink control information to the first UE on a first time domain resource of a second subframe, wherein the second downlink control information comprises second resource indication information, and wherein the second resource indication information indicates the first uplink resource;

receive, on a second time domain resource of the second subframe, uplink data sent by the first UE by using the first uplink resource according to the second downlink control information; and send third downlink control information to the first UE on a first time domain resource of a third subframe, wherein the third downlink control information comprises second reception status indication information, and wherein the second reception status indication information indicates a reception status of the uplink data.

20. The system according to claim 17, wherein the first UE is further configured to:
receive second downlink control information sent by the base station on a first time domain resource of a second subframe, wherein the second downlink control information comprises second resource indication information, wherein the second resource indication information indicates a first uplink resource, wherein the first uplink resource is an uplink resource allocated by the base station to the first UE according to the uplink resource request message within a time period corresponding to a time domain resource after the third time domain resource of the first subframe;
send uplink data to the base station on a second time domain resource of the second subframe by using the first uplink resource according to the second downlink control information; and
receive, on a first time domain resource of a third subframe, third downlink control information sent by the base station, wherein the third downlink control information comprises second reception status indication information, and the second reception status indication information indicates a reception status of the uplink data.

* * * * *